US008542785B2

(12) United States Patent
Fujimura et al.

(10) Patent No.: US 8,542,785 B2
(45) Date of Patent: Sep. 24, 2013

(54) COMMUNICATION APPARATUS AND COMMUNICATION SYSTEM

(75) Inventors: Akinori Fujimura, Tokyo (JP); Kazunari Kihira, Tokyo (JP); Yasushi Sogabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 180 days.

(21) Appl. No.: 13/126,792

(22) PCT Filed: Jul. 2, 2009

(86) PCT No.: PCT/JP2009/062132
§ 371 (c)(1),
(2), (4) Date: Apr. 29, 2011

(87) PCT Pub. No.: WO2010/050269
PCT Pub. Date: May 6, 2010

(65) Prior Publication Data
US 2011/0206155 A1    Aug. 25, 2011

(30) Foreign Application Priority Data

Oct. 30, 2008    (JP) ................................ 2008-280185

(51) Int. Cl.
*H03D 1/04* (2006.01)
(52) U.S. Cl.
USPC ........... 375/346; 375/260; 375/267; 375/340; 375/342; 455/12.1; 455/114.2; 455/272; 455/278.1; 455/296; 455/427; 455/429; 455/450; 342/368; 342/371; 342/372; 342/422; 342/423
(58) Field of Classification Search
USPC ...... 375/260, 267, 340, 342, 346; 455/114.2, 455/272, 427, 12.1, 429, 450, 63.1, 278.1, 455/296; 342/368, 371, 372, 422, 423
See application file for complete search history.

(56) References Cited

U.S. PATENT DOCUMENTS

| 5,754,138 A | 5/1998 | Turcotte et al. |
| 5,754,139 A | 5/1998 | Turcotte et al. |

(Continued)

FOREIGN PATENT DOCUMENTS

| JP | 10-145131 | 5/1998 |
| JP | 10 145260 | 5/1998 |

(Continued)

OTHER PUBLICATIONS

Office Action issued Nov. 29, 2011 in Japanese Patent Application No. 2010-535704 (with partial English translation).

(Continued)

*Primary Examiner* — Sophia Vlahos
(74) *Attorney, Agent, or Firm* — Oblon, Spivak, McClelland, Maier & Neustadt, L.L.P.

(57) ABSTRACT

A communication apparatus that can suppress an increase in circuit size and reduce influence of interference, includes reception array antenna elements, a reception digital beam forming (DBF) network that generates a reception beam signal for forming M reception beams using a reception signal, and reception filter banks (FBs) that generate frequency split reception beam signals obtained by frequency-splitting the reception beam signal. The communication apparatus includes an interference-source detecting unit that stores, for each reception beam, an interference candidate beam area estimated based on an initial reception beam characteristic, calculates, based on the frequency split reception beam signals, a reception spectrum, and calculates, based on the reception spectrum and a reception spectrum of a reception beam to the interference candidate beam area, an interference source area. The reception DFB network generates a reception beam signal to perform null formation in the direction of the interference source area.

25 Claims, 15 Drawing Sheets

(56) References Cited

U.S. PATENT DOCUMENTS

| | | | |
|---|---|---|---|
| 6,061,023 A | 5/2000 | Daniel et al. | |
| 6,075,484 A | 6/2000 | Daniel et al. | |
| 7,593,381 B2 | 9/2009 | Tong et al. | |

FOREIGN PATENT DOCUMENTS

| | | |
|---|---|---|
| JP | 10-145275 | 5/1998 |
| JP | 2001 507917 | 6/2001 |
| JP | 2002 543436 | 12/2002 |
| JP | 2003-134018 | 5/2003 |
| JP | 2007-295079 | 11/2007 |
| JP | 2002 064331 | 2/2008 |

OTHER PUBLICATIONS

International Search Report issued Aug. 4, 2009 in PCT/JP09/062132 filed Jul. 2, 2009.

Hitoshi Kiya, "Multi-Rate Signal Processing", Shokodo, Fig. 6.5 (a), (b), pp. 91-95. (w/English translation).

Masato Tanaka, et al., "Terrestrial/Satellite-Shared Mobile Communication System for Nation's Security and Safety", Institute of Electronics, Information and Communication Engineers, General Meeting, 2008, pp. SS-4-SS-5. (w/English translation).

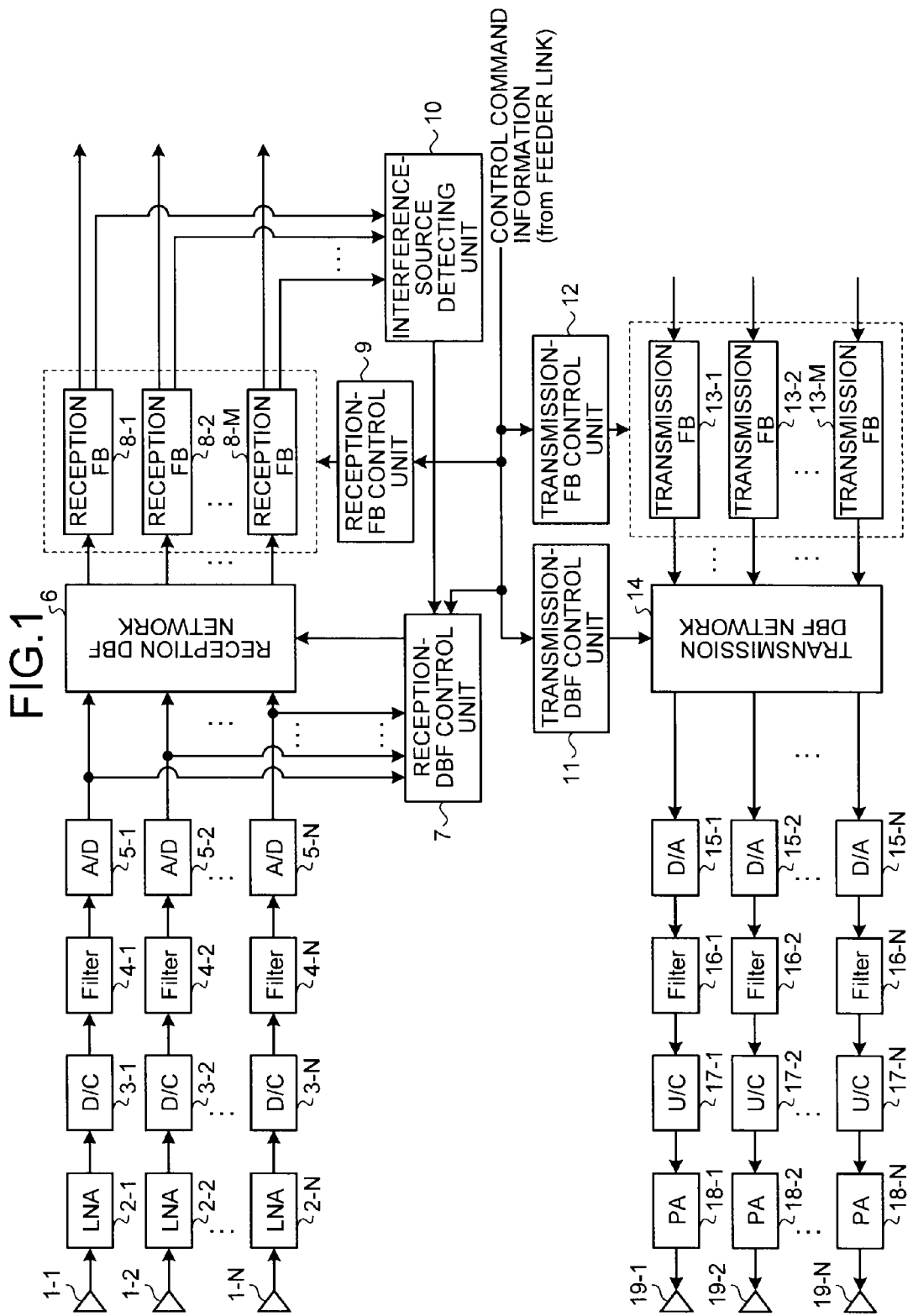

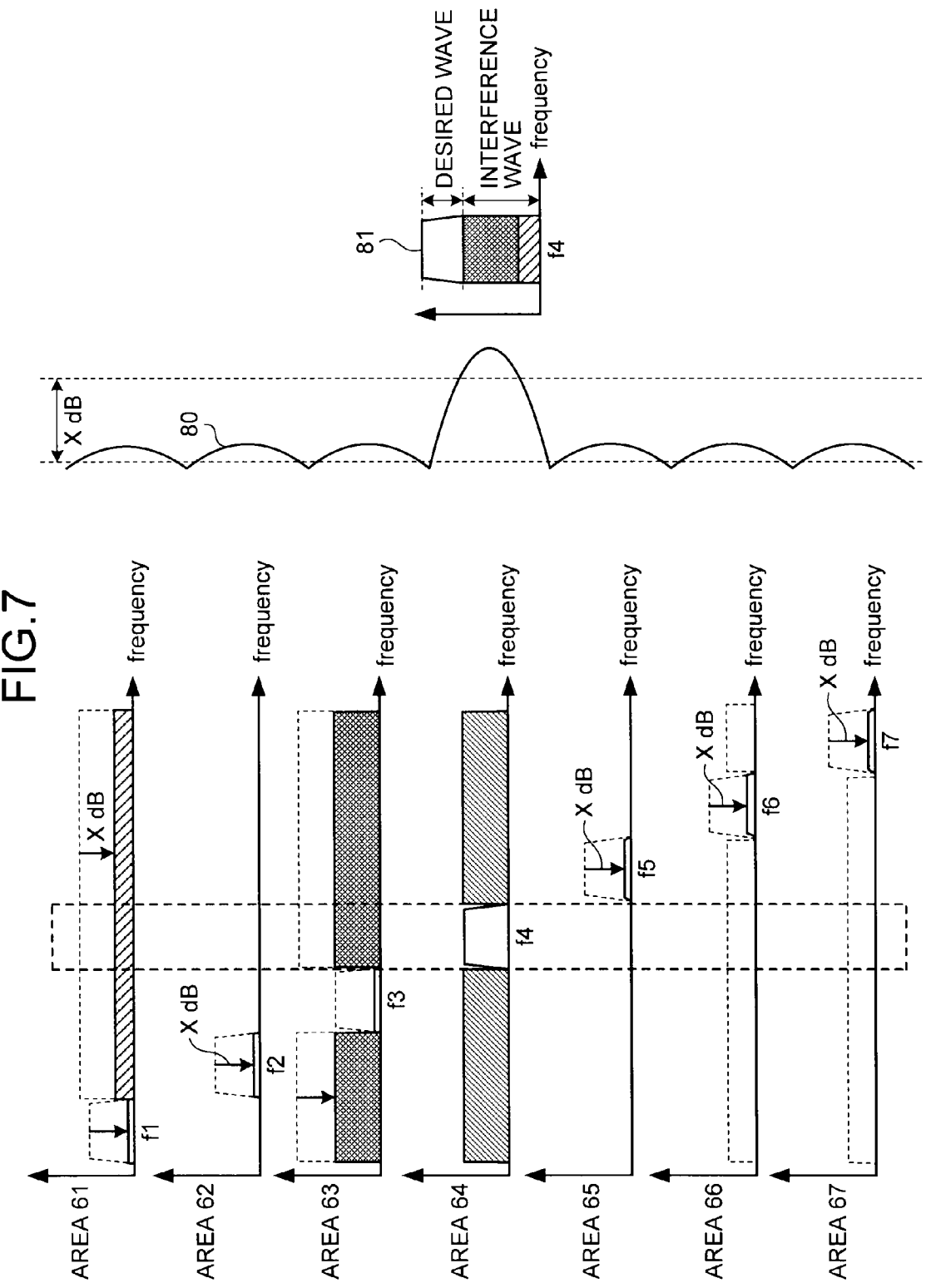

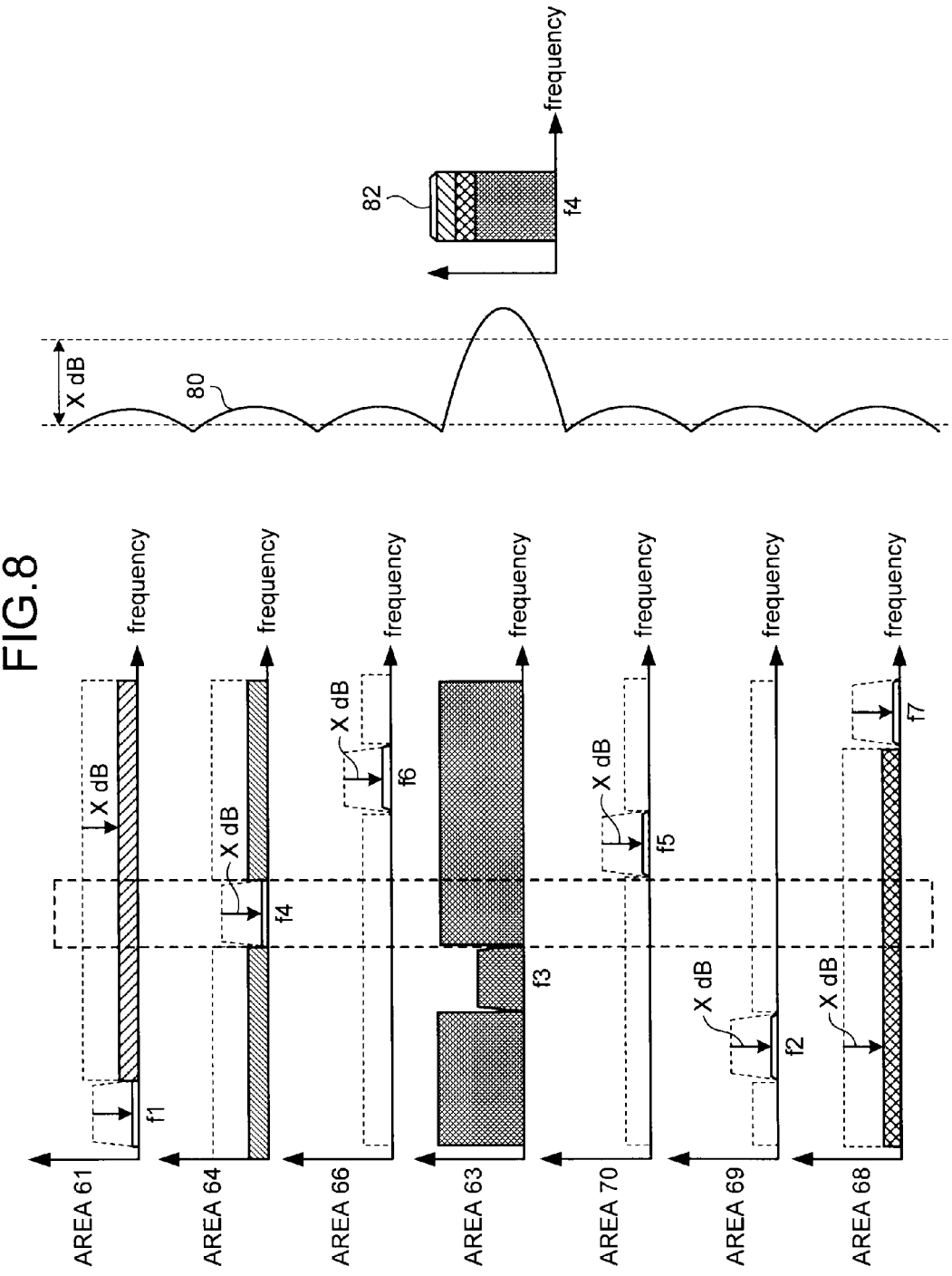

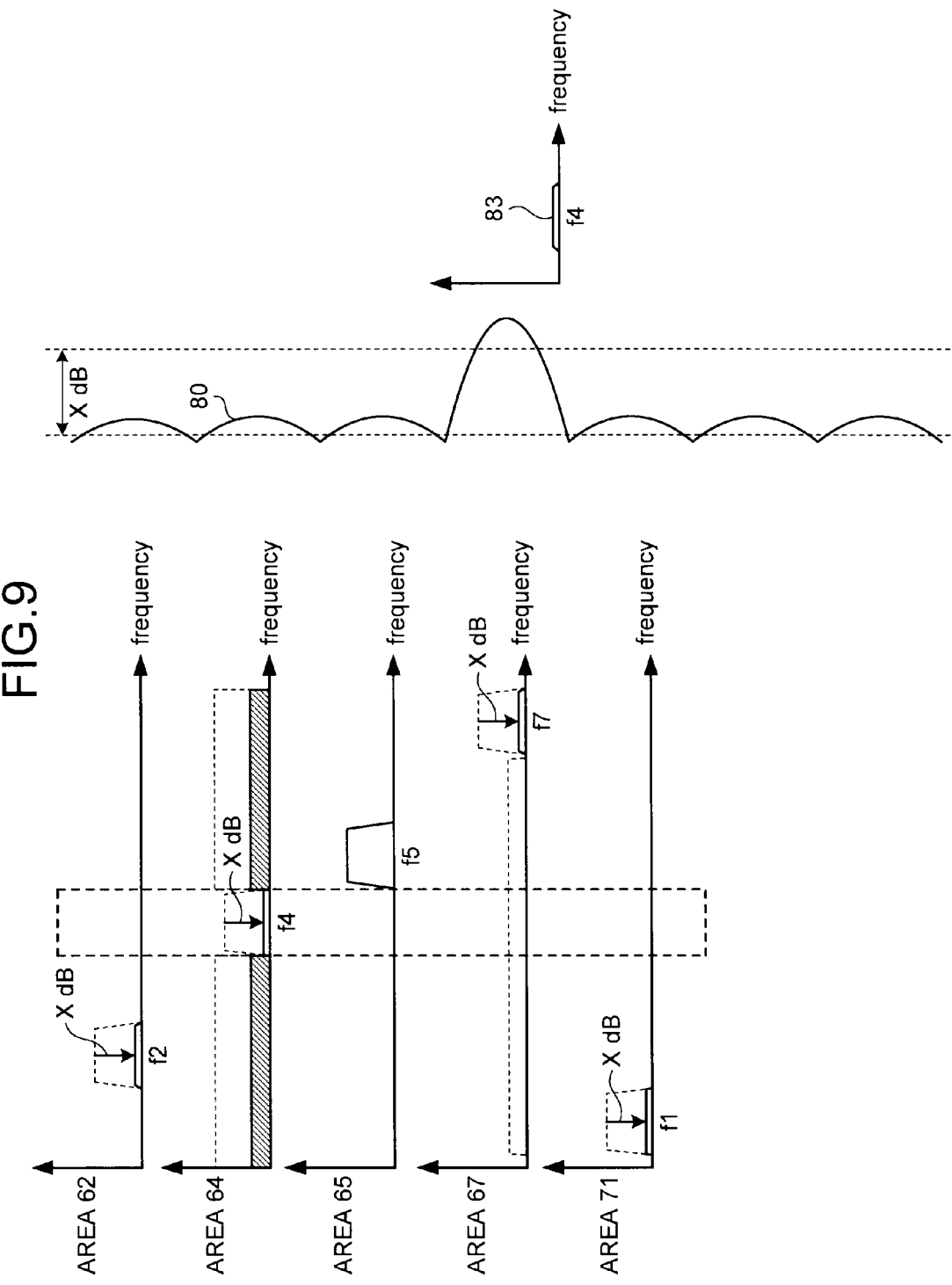

COMMUNICATION APPARATUS AND COMMUNICATION SYSTEM

FIELD

The present invention relates to a multi-beam communication system that covers a communication area with a plurality of beams, and, more particularly to a hybrid mobile communication system shared by a ground radio system and a satellite mobile system.

BACKGROUND

As an example of a multi-beam satellite communication system in the past that covers a communication area with a plurality of beams, a satellite communication system described in Patent Literature 1 is explained. The satellite communication system described in Patent Literature 1 includes a satellite and ground stations connected to a ground network line. The satellite forms a plurality of beams. When areas in which radio terminals and the satellite can communicate using the beams formed by the satellite are referred to as beam areas, all lines that communicate with the beam areas are referred to as user link radio lines.

In this communication system, a frequency band used by the user link radio lines is the same in all the beam areas (a frequency f1). However, a frequency band used in feeder link radio lines, which are radio lines between the satellite and the ground stations, is a frequency different from f1. The satellite is a stationary satellite or an orbit satellite that orbits the Earth.

First, a flow of communication of a forward link (a direction in which signals are transmitted from a user connected to the ground network line to the radio terminals through the satellite) is explained. The satellite receives forward link signals from the ground network line via the ground stations using the feeder link radio lines. Further, after splitting and extracting the received forward link signals from the ground network line, the satellite combines the forward link signals in beam unit while distributing the forward link signals to the beam areas according to control command information from the ground stations and transmits the forward link signals to the beam areas using the user link radio lines. According to the signal processing flow, the radio terminals present in the beam areas can receive signals transmitted from users of the ground network line.

A flow of communication in a return link (a direction in which signals are transmitted from the radio terminals to the ground network line through the satellite) is explained. The satellite receives return link signals from the radio terminals in the beam areas using the user link radio lines. Further, after splitting and extracting the received return link signals from the beam areas according to control command information from the ground stations, the satellite combines signals from a plurality of beams and transmits the signals to the ground stations using the feeder link radio lines. The ground stations split and extract reception signals from the satellite and transmit the reception signals to the ground network line. According to the signal processing flow, the signals transmitted from the radio terminals in the beam areas can be transmitted to the users of the ground network line.

The satellite of the satellite communication system in the past realizes multi-beam transmission and reception on the user link (user link radio line) side using a digital beam forming technology. Specifically, the satellite includes a user link side transceiver. The user link side transceiver includes reception array antenna elements including N (N is a natural number) array antenna elements, low-noise amplifiers (LNAs), down-converters (D/Cs), reception analog filters, AD (Analog to Digital) converters, a reception DBF (Digital Beam Forming) network, reception-DBF control units, reception FBs (Filter Banks), a reception-FB control unit, a transmission-FB control unit, transmission FBs, a transmission-DBF control unit, a transmission DBF network, DA converters, transmission analog filters, up-converters (U/Cs), power amplifiers (PAs), and transmission array antenna elements.

The user link side transceiver receives, with a reception array antenna, signals transmitted from the radio terminals in the beam areas. In some case, the reception array antenna receives signals from the beam areas via reflecting mirrors. Each of the N LNAs amplifies a reception signal received by the reception array antenna corresponding to one array element. Each of the N D/Cs frequency-converts a reception signal after amplification corresponding thereto into a direct current (DC) or an intermediate (IF) frequency. Each of the N reception analog filters extracts a desired system band signal from the reception signal after the frequency conversion corresponding thereto. Each of the N A/D converters samples the signal after passing the reception analog filter corresponding thereto and converts the signal into a digital signal.

The reception-DBF control unit calculates, based on control command information transmitted from the ground stations through the feeder link radio lines (information concerning, for example, a beam radiation direction calculated from the location and the posture of the satellite) and A/D-converted digital signals, weight values for forming reception antenna patterns directed in an arriving direction of a desired signal and outputs a result of the calculation to the reception DBF network. After multiplying together weight values corresponding to L (L is a natural number) digital signals among N digital signals and performing amplification and phase control, the reception DBF network adds up all the weight values to form a first reception antenna pattern and outputs a result of the addition as a first reception beam signal.

Similarly, the reception DBF network multiplies together weight values corresponding to other L digital signals and adds up all the weight values to form a second reception antenna pattern and outputs a result of the addition as a second reception beam signal. In this way, the reception DBF network outputs M (M is a natural number) reception beam signals in total from the first reception beam signal to an Mth reception beam signal.

The reception-FB control unit outputs, based on control command information transmitted through the feeder link radio lines, frequency division instruction information indicating division content of the reception beam signals to M reception FBs. Each of the M reception FBs splits, based on the frequency division instruction information from the reception-FB control unit, the reception beam signal corresponding thereto into a plurality of signals.

The reception FB and the transmission FB explained later can be realized by, for example, a configuration described in Non-Patent Literature 1. Non-Patent Literature 1 describes a configuration for realizing {division into two, division into four, division into eight} of a band of an input signal. The reception FB includes first to seventh seven two-channel filter banks and a selecting unit. Each of the two-channel filter banks includes a high-frequency side decimeter that down-samples sampling speed to a half after dividing a frequency band of an input signal into two and extracting a divided higher frequency component and a low-frequency side decimeter that down-samples sampling speed to a half after extracting a divided lower frequency component.

A signal input to the reception FB is first input to a first two-channel filter bank. An output of the high-frequency side decimeter and an output of the low-frequency side decimeter of the first two-channel filter bank are respectively input to the second two-channel filter bank and the third two-channel filter bank. An output of the high-frequency side decimeter and an output of the low-frequency side decimeter of the second two-channel filter bank are respectively input to the fourth two-channel filter bank and the fifth two-channel filter bank. An output of the high-frequency side decimeter and an output of the low-frequency side decimeter of the third two-channel filter bank are respectively input to the sixth two-channel filter bank and the seventh two-channel filter bank. Outputs of the first to seventh two-channel filter banks are input to the selecting unit.

For example, in the case of an input signal including four frequency bands F1 to F4 (F1<F2<F3<F4, when frequency band width of F1 is 1, frequency band widths of F2, F3, and F4 are respectively 1, 2, and 4), the selecting unit can obtain a signal in the frequency band F1 by selecting the output of the low-frequency side decimeter of the seventh two-channel filter bank. The selecting unit can obtain a signal in the frequency band F2 by selecting the output of the high-frequency side decimeter of the seventh two-channel filter bank. The selecting unit can obtain a signal in the frequency band F3 by selecting the output of the high-frequency side decimeter of the third two-channel filter bank. The selecting unit can obtain a signal in the frequency band F4 by selecting the output of the high-frequency side decimeter of the first two-channel filter bank.

The selecting unit discards frequency components other than the frequency bands used in this satellite system without selecting the frequency components. For example, when the signal in the frequency band F4 is not a signal of this satellite system (e.g., in the case of an interference wave or signals of other systems), the selecting unit discards the output of the high-frequency side decimeter of the first two-channel filter bank without selecting the output.

Split signals selected and output by the selecting unit are combined by the satellite together with signals obtained by splitting other reception beam signals and are transmitted to the ground stations using the feeder link radio lines.

A transmission operation is explained below. The transmission FB corresponding to each beam combines, based on frequency combining instruction information from the transmission-FB control unit, signals transmitted from the feeder link radio lines into one transmission beam signal. In other words, M transmission beam signals are output from M transmission FBs. The transmission DBF network multiplies L' copied predetermined transmission beam signals with L' weight values instructed by the transmission-DBF control unit. When this processing is executed on each of the M transmission beam signals, L'×M signals are obtained. The transmission DBF network outputs N (<L'×M) DBF transmission signals by combining the L'×M signals as appropriate by sharing the transmission array elements.

Each of the N D/A converters converts the DBF transmission signal corresponding thereto from a digital signal into an analog signal. Each of the N transmission analog filters removes an image component from the analog signal corresponding thereto. Each of the N U/Cs frequency-converts the signal (the analog DBF signal) after the image removal corresponding thereto into a radio frequency different from a frequency on a reception side.

Each of the N PAs amplifies the analog DBF signal converted into the radio frequency corresponding thereto. The transmission array antenna outputs amplified analog DBF signals to the space. The transmission array antenna can output the analog DBF signals to the space via the reflecting mirrors.

To realize frequency sharing with other systems, the satellite of the satellite communication system described in Patent Document 1 detects a signal (=an interference wave) from the other systems. When a signal from the other systems is detected, the satellite performs prevention of influence of the interference through null formation of an antenna pattern in an arriving direction of the signal. Concerning a method of estimating an arriving direction of a signal source, various methods are already established. For example, a beam former method and a multiple signal separating method (MUSIC) are representative methods.

The reception-DBF control unit performs specific signal processing for interference prevention. The reception-DBF control unit analyzes a signal source of an arriving signal. When the reception-DBF control unit determines that the signal is not a signal of the own satellite communication system, the reception-DBF control unit determines that the signal is an interference wave, calculates a weight value to perform null formation of an antenna pattern in an interference direction, and outputs the weight value to the reception DBF network. The reception DBF network performs the null formation of the antenna pattern in the interference direction using this weight value and performs interference reduction to a degree not affecting communication.

Citation List

Patent Literature

Patent Literature 1: Japanese Patent Application Laid-Open No. H10-145260

Non Patent Literature

Non Patent Literature 1: "Multi-Rate Signal Processing", Hitoshi Kiya, Shokodo, pp. 94, FIG. 6.5 (a), (b)

Non Patent Literature 2: "Ground and Satellite Shared Mobile Communication System for Safety and Relief", Institute of Electronics, Information and Communication Engineers, 2008, General Meeting, BP-1-3

SUMMARY

Technical Problem

In recent years, a hybrid mobile communication system shared by a ground radio cellular system and a multi-beam satellite system is examined (see, for example, Non-Patent Document 2). In this hybrid mobile communication system, for example, a frequency band (30 MHz) distributed to a satellite system by IMT (International Mobile Telecommunication)-2000 is shared by a satellite system and another ground cellular phone system to realize effective utilization of frequencies. However, in this frequency sharing system, it is an object to prevent interference of the systems.

In this system, a source of interference with a reception system of a satellite is radio waves of cellular phones of the ground radio cellular system in a neighbor area in which a frequency same as a frequency in a target beam area is used. When it is assumed that the radius of a beam area of the satellite is 100 kilometers and the radius of ground radio cellulars is 1 kilometer, the number of ground cellulars per area of one beam area of the satellite can be estimated as about 10000. In this way, interference waves emitted from the neighbor area (=radio waves from cellular phones) are innumerably present. Therefore, it is difficult for the satellite to estimate an arriving direction for each of interference waves and realize null formation of antenna patterns with respect to all the interference waves.

For example, when a plurality of city areas are present on the ground, innumerable interference waves from the cities occur. In an area other than an area where a frequency shared by both of the ground radio cellular system and the multi-beam satellite system is limited to only use on the satellite system side (hereinafter referred to as limited area), the ground radio cellular system can use a frequency shared with the multi-beam satellite system. Therefore, interference waves from innumerable cellular phones arrive at the satellite. A generation distribution of the interference waves is proportional to population density at every moment. In particular, the number of interference waves from the city areas is enormous. A large number of interference sources at a large level that cannot be entirely removed by a side lobe of a reception antenna pattern at the time of initial setting occur around the city areas. The satellite needs to form nulls for all the interference sources. However, in the reception-DBF control unit, enormous calculations and an enormous circuit size for forming innumerable nulls are required. Therefore, it is extremely difficult to realize hardware.

For simplification, in the above explanation, one frequency band is shared by the systems. However, actually, taking into account mobility of radio terminals included in the multi-beam satellite system, the shared frequency band is divided into a plurality of frequency bands and the divided frequency bands are used in different cells. For example, the frequency band shared by both the systems is divided into three and the divided frequency bands are respectively represented as f1, f2, and f3. In this case, because frequency sharing is performed in unit of the divided frequencies (f1, f2, and f3), a problem same as the problem that occurs when the frequency band is not divided occurs.

The present invention has been devised in view of the above and it is an object of the present invention to obtain a communication apparatus and a communication system that can suppress an increase in circuit size and reduce influence of interference from the ground radio cellular system.

Solution to Problem

In order to solve the above problem and in order to attain the above object, a communication apparatus of the present invention including a reception array antenna having N (N is a natural number) array antenna elements, a reception-beam forming unit that generates a reception beam signal for forming M (M is a natural number) reception beams in different beam areas using a reception signal for each of the array antenna elements according to digital beam formation processing, and a reception filter bank that generates frequency split reception beam signals obtained by frequency-splitting the reception beam signal, includes:

an interference-source detecting unit that stores, for each reception beam, an interference candidate beam area as a beam area that is estimated based on an initial reception beam characteristic set in advance and interferes with the reception beam, calculates, based on the frequency split reception beam signals, a reception spectrum for each reception beam, and calculates, based on the reception spectrum for each reception beam and a reception spectrum of a reception beam directed to the interference candidate beam area, for each combination of a reception beam and a frequency, an interference source area as a beam area to be an interference source. Additionally, the reception-beam forming unit generates, for each combination of a reception beam and a frequency, the reception beam signal to perform null formation in a direction of the interference source area.

Advantageous Effects of Invention

According to the present invention, in this embodiment, the interference-source detecting unit calculates average electric power based on signals split in minimum frequency unit, calculates a reception signal spectrum, detects, based on a relation between the reception signal spectrum and a transmission signal from an area predicted as an interference source area, the interference source area that is an adjacent area where a strong interference wave occurs, and calculates weight to apply null formation to the detected interference source area. Therefore, there is an effect that it is possible to suppress an increase in circuit size and reduce the influence of interference from a ground radio cellular system.

BRIEF DESCRIPTION OF DRAWINGS

FIG. 1 is a diagram of a functional configuration example of a communication apparatus according to a first embodiment of the present invention.

FIG. 6-1 is a diagram of a spectrum example of signals arriving at a satellite.

FIG. 6-2 is a diagram of a spectrum example of signals arriving at the satellite.

FIG. 7 is a diagram of an example of signal beam signal formation processing in which initial reception beam formation is performed in the direction of an area 64.

FIG. 8 is a diagram of an example of reception beam signal formation processing in which initial reception beam formation is performed in the direction of an area 63.

FIG. 9 is a diagram of an example of reception beam signal formation processing in which initial reception beam formation is performed in the direction of an area 65.

DESCRIPTION OF EMBODIMENTS

Embodiments of a communication apparatus and a communication system according to the present invention are explained in detail below with reference to the drawings. The present invention is not limited by the embodiments.

First Embodiment.

Figures 1, 6:
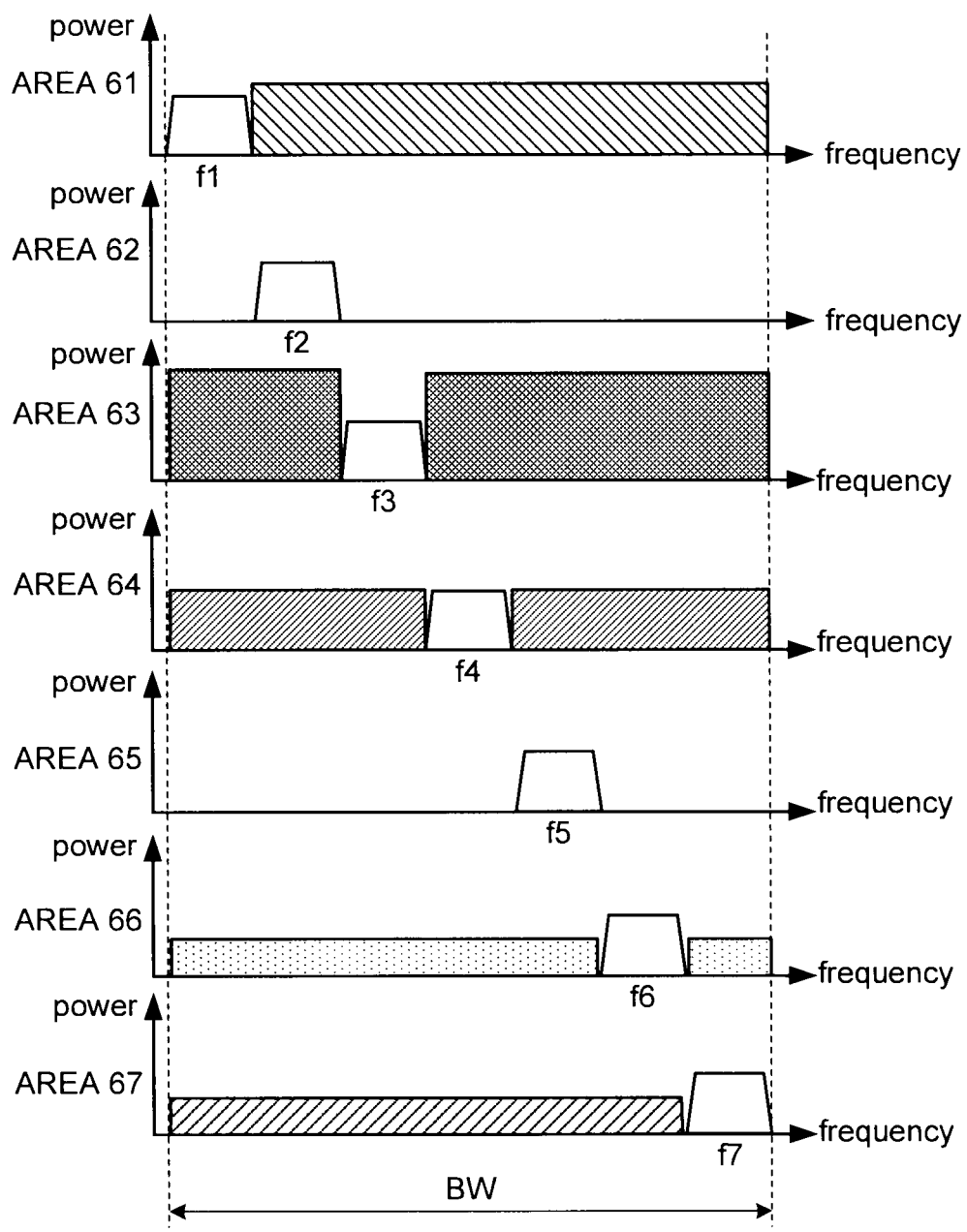
Figures 2, 6:
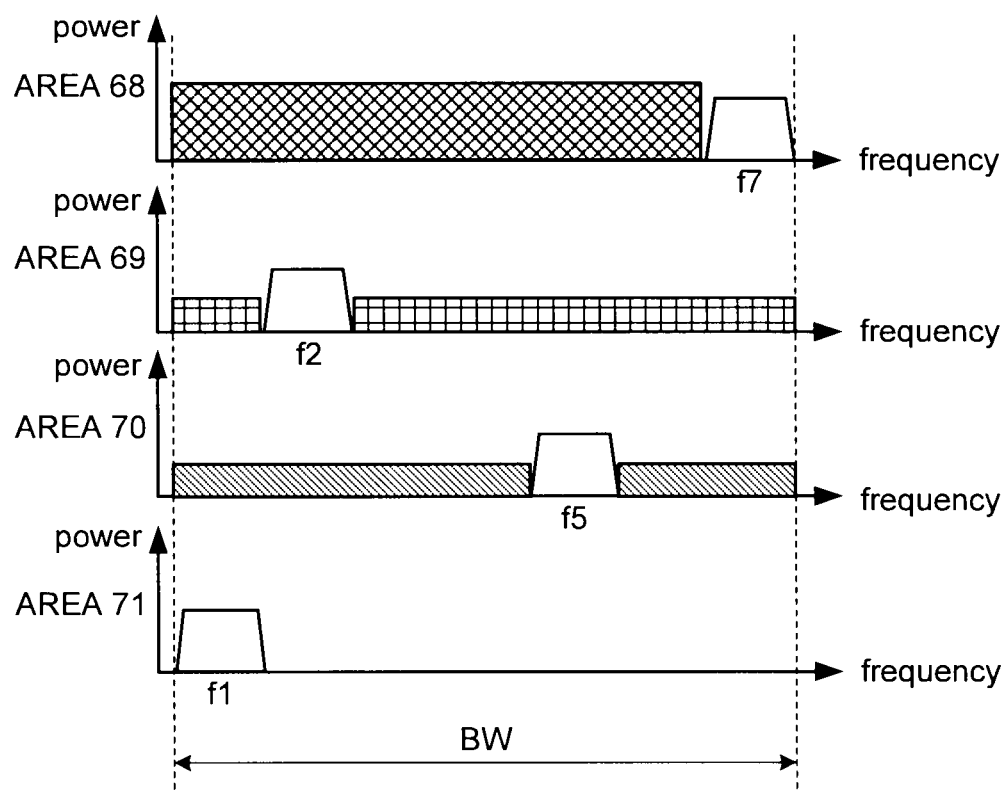

FIG. 1 is a diagram of a functional configuration example of a first embodiment of a communication apparatus according to the present invention. The communication apparatus according to this embodiment is mounted on a satellite such as a stationary satellite or an orbit satellite. As shown in FIG. 1, the communication apparatus according to this embodiment includes a reception array antenna including reception array antenna elements 1-1 to 1-N (N is a natural number), LNAs 2-1 to 2-N respectively connected to the reception array antenna elements 1-1 to 1-N, down-converters (D/Cs) 3-1 to 3-N, filters 4-1 to 4-N as reception analog filters, AD converters (A/Ds) 5-1 to 5-N, a reception DBF network 6, a reception-DBF control unit 7, reception FBs 8-1 to 8-M (M is a natural number), a reception-FB control unit 9, and an interference-source detecting unit 10. The communication apparatus according to this embodiment further includes a transmission-DBF control unit 11, a transmission-FB control unit 12, transmission FBs 13-1 to 13-M, a transmission DBF network 14, DA converters (D/As) 15-1 to 15-N, filters 16-1 to 16-N as transmission analog filters, up-converters (U/Cs) 17-1 to 17-N, power amplifiers (Pas) 18-1 to 18-N, and transmission array antenna elements 19-1 to 19-N.

The communication apparatus according to this embodiment forms multi-beams (forms M beam areas) and performs, through feeder link lines, communication with ground stations connected to a ground network. The communication apparatus according to this embodiment, the ground stations, and user terminals that communicate with the communication apparatus in the beam areas configure a communication system. The user terminals in the communication system according to this embodiment can perform communication with users on the ground network through the communication apparatus according to this embodiment and the ground stations.

In this embodiment, a ground radio cellular system and the communication system (a multi-beam satellite system) according to this embodiment share a system band. In the communication system according to this embodiment, the system band is divided into a predetermined number of bands. Divided frequencies are allocated to each of the beam areas and used.

In this embodiment, each of the reception FBs calculates, using functions of the reception FBs included in the satellite in the past that forms multi-beams, an average of split signal powers, specifies, based on the average, a beam area that generates strong interference in average, and performs null formation of antenna patterns in beam area unit. According to this processing, complicated arithmetic processing for estimating an arriving direction of an interference wave performed in the reception-DBF control unit in the past can be eliminated. The number of antenna patterns for which the null formation is performed can be substantially reduced. Therefore, substantial reduction in signal processing and circuit size is achieved and the system frequency is shared with the ground radio cellular system. Even when innumerable interference waves are present, it is possible to realize a communication apparatus mounted on a satellite as hardware.

Operations in this embodiment are explained below. First, a transmission operation is explained. Each of the transmission FBs 13-1 to 13-N according to this embodiment combines, based on frequency combination instruction information from the transmission-FB control unit 12, signals transmitted from the feeder link radio lines into one transmission beam signal. In other words, M transmission beam signals are output from the M transmission FBs 13-1 to 13-M. The transmission DBF network 14 multiplies L' copied predetermined transmission beam signals with L' weight values instructed from the transmission-DBF control unit 11. The frequency combination instruction information and L' transmission began signals are transmitted from the ground stations in advance. When this processing is executed on each of the M transmission beam signals, L'×M signals are obtained. The transmission DBF network 14 outputs N (<L'×M) DBF transmission signals by combining the L'×M signals as appropriate by sharing the transmission array elements.

The D/A 15-i (i=1 to N) converts the DBF transmission signal corresponding thereto from a digital signal into an analog signal. The filter 16-i removes an image component from the analog signal converted by the D/A 15-i. The U/C 17-i frequency-converts the signal (the analog DBF signal) from which the image component is removed by the filter 16-i into a radio frequency different from a frequency on a reception side.

The PA 18-i amplifies the analog DBF signal converted into the radio frequency by the U/C 17-i. The transmission array antenna element 19-i outputs the analog DBF signal amplified by the PA 18-i to the space. The transmission array antenna element 19-i can output the analog DBF signal to the space via the reflecting mirror.

A reception operation is explained below. The communication apparatus according to this embodiment receives, with a reception array antenna (an array antenna including reception array antenna elements 1-1 to 1-N), signals transmitted from the radio terminals in the beam areas generated by the communication apparatus. In some case, the reception array antennas receive the signals from the beam areas via reflecting mirrors.

The LNA 2-i (i=1 to N) amplifies a reception signal received by the reception array antenna element 1-i. The D/C 3-i frequency-converts the reception signal amplified by the LNA 2-i into a direct current (DC) or intermediate (IF) frequency. The Filter 4-i extracts a desired system band signal from the reception signal frequency-converted by the D/C 3-i. The A/D 5-i samples the signal extracted by the filter 4-i and converts the signal into a digital signal.

The reception-DBF control unit 71 calculates, based on control command information transmitted from the ground stations through the feeder link radio lines (information concerning, for example, a beam radiation direction calculated from the location and the posture of the satellite) and the digital signals processed by the A/Ds 5-1 to 5-N, weight values for forming reception antenna patterns directed in an arriving direction of a desired signal and outputs a result of the calculation to the reception DBF network 6. After multiplying together weight values corresponding to L (L is a natural number) digital signals among N digital signals processed by the A/Ds 5-1 to 5-N and performing amplification and phase control, the reception DBF network 6 adds up all the weight values to form a first reception antenna pattern and outputs a result of the addition as a first reception beam signal.

Similarly, the reception DBF network 6 multiplies together weight values corresponding to other L digital signals and adds up all the weight values to form a second reception antenna pattern and outputs a result of the addition as a second reception beam signal. In this way, the reception DBF network 6 outputs M (M is a natural number) reception beam signals in total from the first reception beam signal to an Mth reception beam signal.

The reception-FB control unit 9 outputs, based on control command information transmitted through the feeder link radio lines, frequency division instruction information indicating division content of the reception beam signals to the reception FBs 8-1 to 8-N. Each of the M reception FBs splits, based on the frequency division instruction information from the reception-FB control unit 9, the reception beam signal corresponding thereto into a plurality of signals.

Figure 2:
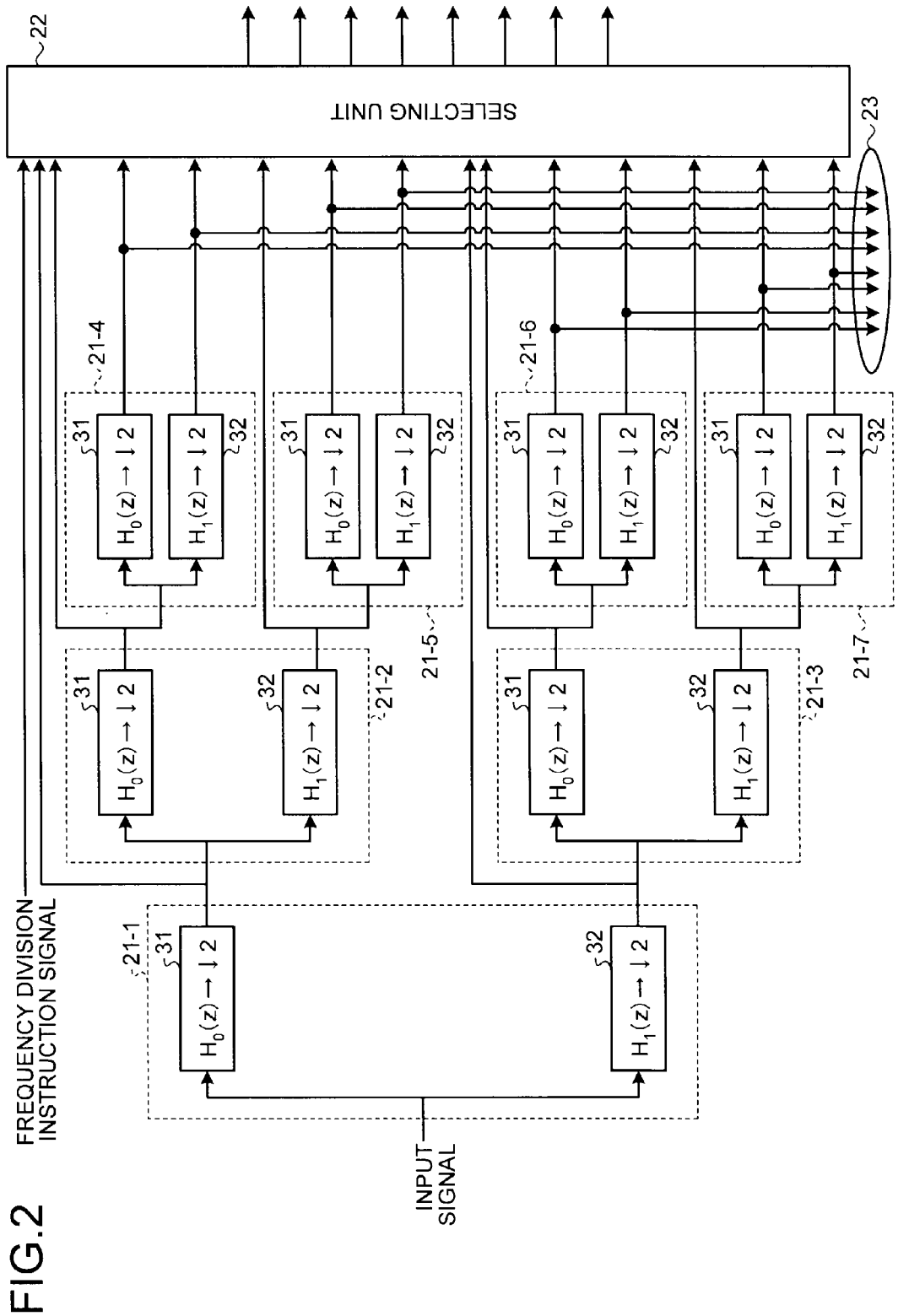
FIG. 2 is a diagram of a functional configuration example of a reception FB according to the first embodiment.

FIG. 2 is a diagram of a functional configuration example of the reception FB 8-1 according to this embodiment. As shown in FIG. 2, the reception FB 8-1 according to this embodiment includes two-channel filter banks 21-1 to 21-7 and a selecting unit 22. The reception FB 8-1 according to this embodiment can be realized by the configuration of the reception FB in the past as explained in, for example, "Multi-Rate Signal Processing", Hitoshi Kiya, Shokodo, pp. 94, FIG. 6.5 (a), (b)'. However, the reception FB 8-1 according to this embodiment is different from the reception FB in the past in that output signals of the two-channel filter banks 21-4 to 21-7 (an output signal 23 in the figure), i.e., signals split in minimum frequency band unit obtained by dividing a usable frequency band are input to the interference-source detecting unit 10. This modification is only addition of outputs. Therefore, the circuit size is not changed from that of the reception FB in the past.

Each of the two-channel filter banks 21-1 to 21-7 includes a high-frequency side decimeter 31 that down-samples sampling speed to a half after dividing a frequency band of an input signal into two and extracting a divided higher frequency component and a low-frequency side decimeter 32 that down-samples sampling speed to a half after extracting a divided lower frequency component. The reception FBs 8-2 to 8-M have a configuration same as that of the reception FB 8-1.

A signal input to the reception FB 8-1 is first input to the two-channel filter bank 21-1. An output of the high-frequency side decimeter 31 and an output of the low-frequency side decimeter 32 of the two-channel filter bank 21-1 are respectively input to the two-channel filter bank 21-2 and the two-channel filter bank 21-3. An output of the high-frequency side decimeter 31 and an output of the low-frequency side decimeter 32 of the two-channel filter bank 21-2 are respectively input to the two-channel filter bank 21-4 and the two-channel filter bank 21-5. An output of the high-frequency side decimeter 31 and an output of the low-frequency side decimeter 32 of the two-channel filter bank 21-3 are respectively input to the two-channel filter bank 21-6 and the two-channel filter bank 21-7. Outputs of the two-channel filter banks 21-1 to 21-7 are input to the selecting unit 22. The selecting unit 22 selects a signal in a frequency band used in the own communication system from the two-channel filter banks 21-1 to 21-7, outputs the signal to user apparatuses or the like at a post stage, and discards signals of frequency components other than the frequency band used in the own communication system.

The interference-source detecting unit 10 calculates average electric power of the signals split in the minimum frequency unit output from the reception FBs 8-1 to 8-N and specifies, based on the calculated average electric power, an area where large number of interference sources occur. Specifically, the interference-source detecting unit 10 performs the processing explained below. First, the interference-source detecting unit 10 calculates electric powers of signals of the output signal 23, calculates a time average of the electric powers as average electric power, and obtains M average power sequences (for each of beams).

Figure 3:
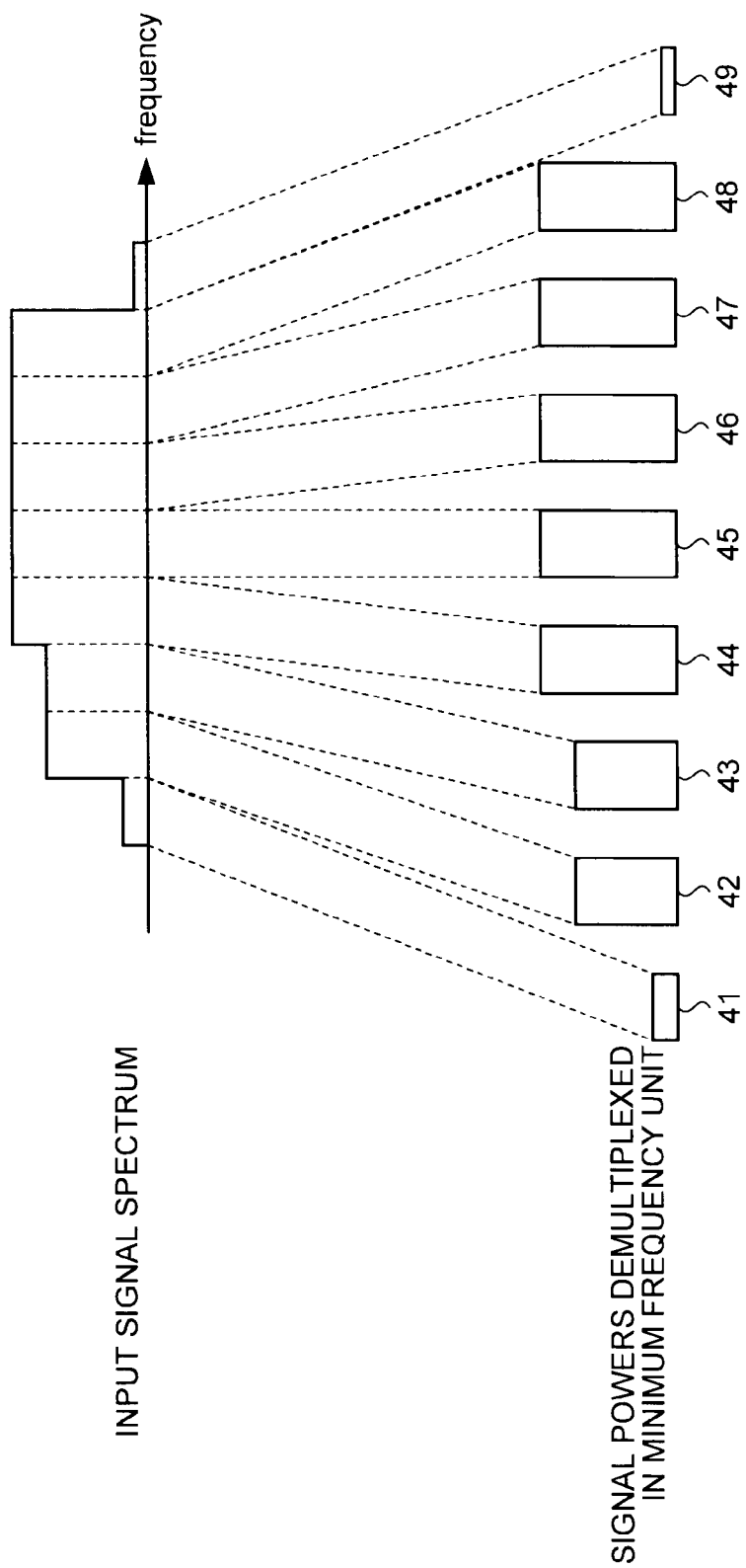
FIG. 3 is a diagram of an example of average electric power of signals split in minimum frequency unit.

FIG. 3 is a diagram of an example of the average electric powers of the signals split in the minimum frequency unit. Average electric powers 41 to 49 in a lower section indicate average electric powers for each of divided frequencies split (divided) in the minimum frequency unit. The average electric powers are the average electric powers calculated by the interference-source detecting unit 10 as explained above. When an input spectrum signal (a spectrum of a reception signal) is formed in shape shown in an upper section, the average electric powers 41 to 49 shown in the lower section are obtained. In other words, it is possible to obtain a spectrum of an input signal represented in the minimum frequency unit by calculating average electric powers of the signals split in the minimum frequency unit.

Specifically, when the shape of a spectrum of a transmission signal in each beam area is known in advance, if an average power sequence calculated by the interference-source detecting unit 10 and the shape of the spectrum coincide with each other, it can be determined that a signal directed to the beam area corresponding to the shape is received. In the following explanation, the average power sequence calculated by the interference-source detecting unit 10 is referred to as reception signal spectrum.

Figure 4:
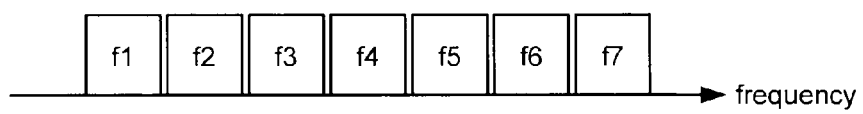
FIG. 4 is a diagram of a division example of a system band.

Interference source area estimation processing using the reception signal spectrum executed by the interference-source detecting unit 10 is explained below. FIG. 4 is a diagram of a division example of a system band. As shown in FIG. 4, in an example explained below, a system band shared by a ground radio cellular system and the communication system according to this embodiment is equally divided into seven {f1, f2, f3, f4, f5, f6, and f7}.

Figure 5:
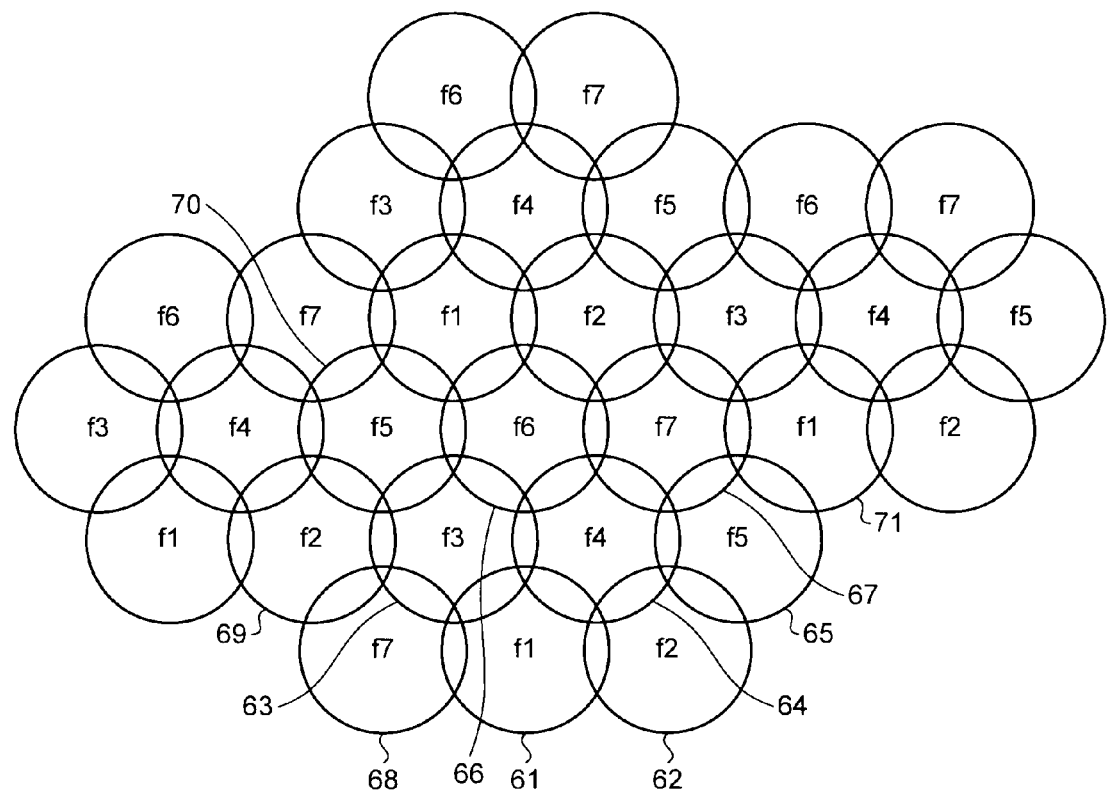
FIG. 5 is a diagram of an example of beam areas of a communication system according to the first embodiment and frequencies in use.

FIG. 5 is a diagram of an example of beam areas of the communication system according to this embodiment and frequencies in use. In FIG. 5, frequencies divided into seven shown in FIG. 4 are allocated to the beam areas and used. Circles shown in FIG. 5 indicate beam areas (cells) generated by the satellite. The beam areas shown in FIG. 5 indicate fixed ranges (areas) on the ground. Irrespective of the location of the satellite mounted with the communication apparatus according to this embodiment, the beam areas indicate beam areas covered when the communication apparatus according to this embodiment generates beams directed to the areas. As shown in FIG. 5, different frequencies are used in the beam areas adjacent to one another. The seven frequencies are repeatedly used in unit of seven cells. For example, in areas 61, 62, 63, 64, 65, 66, and 67, the different frequencies f1, f2, f3, f4, f5, f6, and f7 are respectively used. In the areas 68, 69, 70, and 71 adjacent to the areas 61 to 67, the frequencies f7, f2, f5, and f1 are respectively used.

In the ground radio cellular system that shares the frequencies with the communication system according to this embodiment, frequencies other than frequencies described in the circles ($\in$ {1, f2, f3, f4, f5, f6, f7}) can be used in the beam areas shown in FIG. 5. The area 63 shown in FIG. 5 covers a large city area such as the metropolitan area, the areas 61, 64, and 68 shown in FIG. 5 cover medium-sized city groups, the areas 62, 65, and 71 shown in FIG. 5 cover the ocean where the ground radio cellular system is not present, and the other areas cover agricultural zones or mountain zones.

Spectrum examples of signals arriving at the satellite from the areas 61 to 71 are shown in FIGS. 6-1 and 6-2. Signal spectra indicated by white trapezoids in FIGS. 6-1 and 6-2 indicate spectra of signals transmitted from user terminals in the communication system according to this embodiment. Other hatched spectra indicate spectra of signals transmitted from user terminals of the ground radio cellular system. As it is evident from FIGS. 6-1 and 6-2, in the area 63 that covers the large city area, power of a signal spectrum from the ground radio cellular system is particularly high and, conversely, in the areas 62, 65, and 71 that cover the ocean, no signal spectrum transmitted from the ground radio cellular system is present.

In FIGS. 7 to 9, examples of reception beam signal formation processing in the case of the frequency arrangement shown in FIG. 4 and the conditions shown in FIGS. 6-1 and 6-2 are shown. An example of reception beam signal formation processing in which initial reception beam formation is performed in the direction of the area 64 is shown in FIG. 7. An example of reception beam signal formation processing in which initial reception beam formation is performed in the direction of the area 63 is shown in FIG. 8. An example of reception beam signal formation processing in which initial reception beam formation is performed in the direction of the area 65 is shown in FIG. 9.

A pattern 80 shown in FIGS. 7 to 9 indicates a reception antenna beam pattern at the initial time formed by the communication apparatus according to this embodiment. It is assumed that a reception level of a signal from a target beam area to which a reception beam is directed is maintained by a side lobe characteristic of a reception antenna beam pattern (=0 [dB]) and a signal level from an adjacent beam area is attenuated by X [dB] and signals from the next and subsequent adjacent areas are completely removed.

In this case, a reception signal received from a certain reception beam received by the communication apparatus according to this embodiment is obtained by combining a signal transmitted from an area to which the reception beam is directed and signals of side lobe components attenuated by X [dB], which are transmitted from six adjacent areas. Therefore, for example, a spectrum of a reception signal of a reception beam (a reception beam signal) directed to the area 64 is obtained by combining signal spectra transmitted from the areas 61, 62, 63, 65, 66, and 67 attenuated by X [dB] from an original signal level and a signal spectrum transmitted from the area 64 as shown in FIG. 7.

A spectrum 81 shown in FIG. 7 is a component of the frequency f4 of the spectrum of the reception beam signal directed to the area 64. In FIGS. 7 to 9, rectangles indicated by the same type of hatching indicate components of the same type of signals transmitted from the same area. As indicated by the spectrum 81 shown in FIG. 7, this reception beam signal includes, besides the signal from the area 64 as a desired wave, signals transmitted from the user terminals of the ground radio cellular system in the area 63 and the area 61 as interference waves. In this way, in the example shown in FIG. 7, an interference wave remains in a reception antenna beam pattern at the initial time without being completely removed, the level of the interference wave is larger than the level of the desired wave, and communication is not established.

The areas 61, 62, 63, . . . , and 71 are numbered with area #n (n=1, 2, 3, . . . , and 11) in order. Reception power of signals of frequencies fm (m=1, 2, 3, . . . , and 7) of signals arriving from the areas #n received when reception beams are directed to the areas #n is represented as Pin(n,m). An attenuation ratio w of a signal due to a side lobe of an antenna pattern from an adjacent area (a power ratio of a side lobe to reception power received when a reception beam is directed to the adjacent area) is represented as w=10(−X/10).

In this case, reception power Pout(n,m) of the frequency m received when the communication apparatus according to this embodiment directs a reception beam in the directions of the areas #n can be represented by a formula. For example, reception power Pout(4,4) of the frequency f4 (m=4) received when the reception beam is directed in the direction of the area 64 (n=4) as shown in FIG. 7 can be represented by the following Formula (1):

$$Pout(4,4)=Pin(4,4)+w\times Pin(1,4)+Pin(2,4)+Pi(3,4)+Pin(5,4)+Pin(6,4)+Pin(7,4)) \quad (1)$$

As shown in FIG. 8, a spectrum of a reception beam signal directed to the area 63 is obtained by combining signal spectra from the areas 61, 64, 66, 68, 69, and 70 attenuated by X [dB] and a signal spectrum from the area 63. A spectrum 82 shown in FIG. 8 is a spectrum of a reception beam signal of the frequency f4 of the reception beam signal directed to the area 63. As shown in FIG. 8, in the spectrum 82, a frequency f4 component from the area 63, i.e., a signal from the area 63 in the ground radio cellular system is predominant. In this case, Pout(3,4) can be represented by the following Formula (2):

$$Pout(3,4)=Pin(3,4)+w\times(Pin(1,4)+Pin(4,4)+Pin(6,4)+Pin(8,4)+Pin(9,4)+Pin(10,4)) \quad (2)$$

As shown in FIG. 6-1, in a reception beam signal from the area 63, the level of other frequency components is higher than the level of the frequency f3 as a desired signal. When it is assumed that a total of components of a side lobe of Pout(4,4) is equal to or smaller than a total of components of a side lobe of Pout(3,4), the following Formula (3) holds:

$$Pout(3,4)>Pout(4,4) \quad (3)$$

On the other hand, as shown in FIG. 9, a spectrum of a reception beam signal directed to the area 65 is obtained by combining signal spectra in the areas 62, 64, 65, 67, and 71 attenuated by X [dB] because the beams are beams at ends of an area covered by the communication system according to this embodiment and a signal spectrum in the area 65. In the following explanation, it is assumed that there is no interference from an adjacent area not covered by the communication system according to this embodiment. However, it goes without saying that, when an interference from the adjacent area not covered by the communication system according to this embodiment occurs, a component of an interference wave of the interference attenuated by X [dB] is added.

A spectrum 83 shown in FIG. 9 is a spectrum of the frequency f4 of a reception beam signal directed to the area 65. As shown in FIG. 9, a strong signal of the ground radio cellular system is not present in the frequency f4 band in the adjacent area of the area 65. Therefore, a signal from the frequency f4 band in the area 64 is predominant. Reception power Pout(5,4) of a reception beam signal in the area 65 can be represented by the following Formula (4):

$$Pout(5,4)=Pin(5,4)+w\times(Pin(2,4)+Pin(4,4)+Pin(7,4)+Pin(11,4)) \quad (4)$$

Therefore, as it is evident from FIGS. 7 and 9, the following Formula (5) holds. Therefore, as it is evident when the spectrum of the reception beam signal of the frequency f4 directed to the area 65 and the spectrum of the reception beam signal of the frequency f4 directed to the area 64 are compared, the following formula holds:

$$Pout(4,4)>Pout(5,4) \quad (5)$$

From Formulas (3) and (5), the following Formula (6) holds:

$$Pout(3,4)>Pout(4,4)>Pout(5,4) \quad (6)$$

Figure 10:
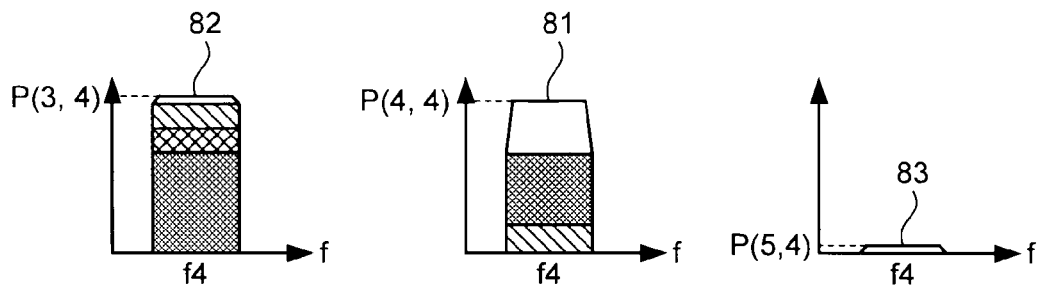
FIG. 10 is a diagram of reception spectra obtained when reception beams are respectively directed to the areas 63, 64, and 65.

FIG. 10 is a diagram of reception spectra (the spectra 81 to 83) obtained when reception beams are respectively directed to the areas 63, 64, and 65. As it is seen from FIG. 10, Pout(3,4) indicates a high value because of the influence of a strong signal from the ground radio cellular system in the area 63. The influence of the strong signal from the ground radio cellular system in the area 63 is added to Pout (4,4) as an interference component.

Making use of the characteristics explained above, the interference-source detecting unit 10 calculates Pin(n,m) based on Pout(n,m) and an known attenuation amount w of an antenna pattern side lobe using, as Pout(n,m), a reception signal spectrum calculated based on output signals from the reception FBs 8-1 to 8-M. When deterioration in frequency direction resolution of electric power is allowed, a reception signal spectrum to be calculated does not need to be signals split in the minimum frequency unit and can be calculated using signals split in rougher frequency unit in a splitting process in the reception FBs 8-1 to 8-M.

Specifically, Pin(n,m) is calculated as explained below. As Pin(n,m), Pin(1,1), Pin(1,2), . . . , and Pin(1,7) arranged in a frequency direction correspond to electric power in the area 61 shown in FIG. 6-1 (a top section). Similarly, Pin(n,1), Pin(n,2), . . . , and Pin(n,7) arranged in the frequency direction are the spectra shown in FIGS. 6-1 and 6-2. However, because of the influence of a side lobe, the interference-source detecting unit 10 calculates Pout(n,m) as a reception spectrum.

As a method of calculation for calculating Pin(n,m), for example, there are fixed relations as indicated by Formulas (1), (2), and (4) between Pout(n,m) and Pin(n,m). These relations are calculated for all n, m and simultaneous equations are solved concerning Pin(n,m), whereby Pin(n,m) can be obtained. In this case, n=M and n areas respectively correspond to M reception beams.

Subsequently, concerning reception beam areas, the interference-source detecting unit 10 detects, in obtained Pin(n, m), a reception beam in which a strong interference wave interfering with communication of the own communication system occurs.

As the detection of an interference wave occurrence area, for example, for each reception beam, the interference-source detecting unit 10 calculates, based on Pin(n,m) corresponding to the reception beam, a desired wave level S, calculates, based on Pin(n,m) in an adjacent area, an interference wave level I of a frequency of the desired wave, and calculates an S/I ratio. The interference-source detecting unit 10 extracts a reception beam in which the S/I ratio is smaller than a predetermined threshold. The interference-source detecting unit 10 detects an adjacent area (an interference source area) influencing the extracted reception beam as an interference source and an interference amount of the adjacent area. The interference-source detecting unit 10 notifies the reception-DBF control unit 7 of the detected interference source area and the detected interference amount. Unlike the related art, the reception-DBF control unit 7 does not estimate an arriving direction of an interference wave but performs, based on information concerning the interference source area from the interference-source detecting unit 10, null formation in an interference direction of the interference source area. Therefore, a calculation amount of the reception-DBF control unit 7 is small. The reception-DBF control unit 7 can be realized by a small circuit.

When the series of interference removal processing is periodically performed, it is possible to realize null formation only in a direction of a city area or the like on which interference sources are concentrated and realize, with a small calculation amount, interference removal of the multi-beam satellite system.

Figure 11:
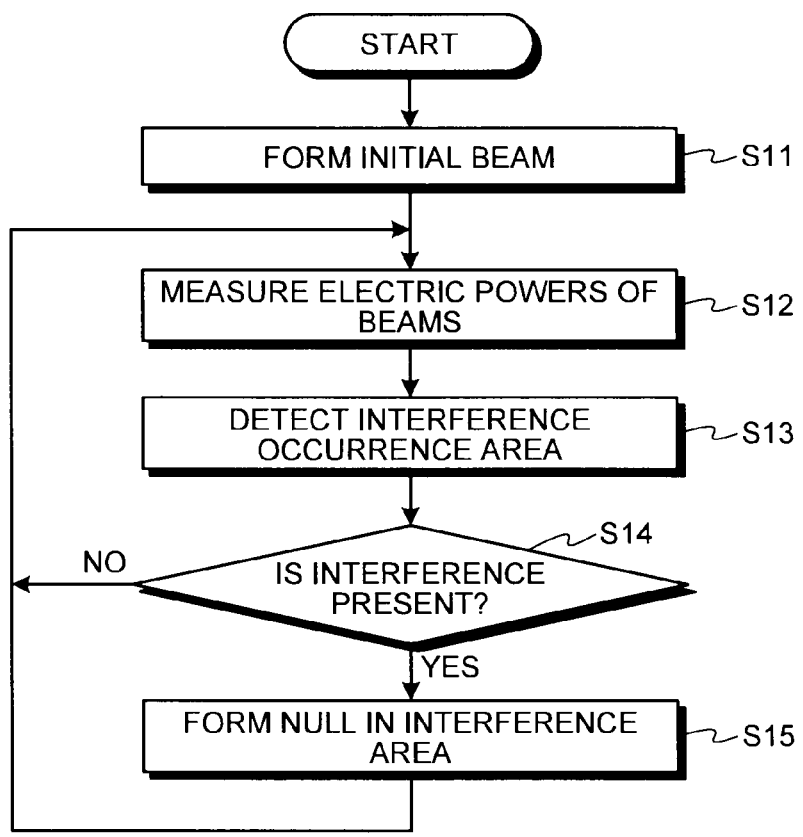
FIG. 11 is a flowchart for explaining an example of a processing procedure of interference removal processing.

FIG. 11 is a flowchart for explaining an example of a processing procedure of the interference removal processing. First, the reception-DBF control unit 7 performs, based on the posture and position information of the satellite, initial reception beam formation directed to beam areas (step S11). Subsequently, the interference-source detecting unit 10 averages output signals of the reception FBs 8-1 to 8-M to thereby measure a reception signal spectrum of each reception beam (step S12). In other words, the interference-source detecting unit 10 calculates Pout(n,m). The interference-source detecting unit 10 solves the simultaneous equations as explained above to calculate Pin(n,m) and detects, based on Pin(n,m), an adjacent area where a strong interference wave occurs (step S13).

The interference-source detecting unit 10 determines whether an adjacent area where a strong interference wave occurs is detected (step S14). When an adjacent area where a strong interference wave occurs is detected (Yes at step S14), the interference-source detecting unit 10 performs null formation in the interference source area (step S15). Specifically, the interference-source detecting unit 10 notifies the reception-DBF control unit 7 of a reception beam in which a desired wave is calculated and an interference source area and an interference amount of interference with the reception beam. The reception-DBF control unit 7 calculates, while directing directivity of an antenna to a beam area corresponding to the reception beam, a weight value for realizing null formation in the interference source area. The reception-DBF control unit 7 outputs the calculated weight value to the reception DBF network 6. The interference-source detecting unit 10 returns to step S12 and repeats the processing. When an adjacent area where a strong interference wave occurs is not detected at step S14 (No at step S14), the interference-source detecting unit 10 returns to step S12.

In this embodiment, frequencies are allocated with seven cells set as one unit and the frequencies are repeated at every seven cells. However, frequency arrangement is not limited to this. Any frequency arrangement can be adopted as long as frequencies are repeated with three or more cells set as a unit.

In this embodiment, as the characteristics of the reception antenna beam pattern at the initial time, it is assumed that a signal level from an area to which a beam is directed is maintained (=0 [dB]), a signal level from an adjacent beam area is attenuated by X [dB], and signals from the next and subsequent adjacent beam areas are completely removed. However, the characteristics of the reception antenna beam pattern at the initial time are not limited to this. Any characteristics can be adopted as long as the characteristics are antenna pattern characteristics having directivity formed by DBF (Digital Beam Forming). For example, even with characteristics that a side lobe characteristic is gentle and signals not only from an adjacent beam area but also from the next adjacent beam area cannot be sufficiently attenuated, the interference prevention processing can be realized. In this case, simultaneous equations are set up taking into account the signal in the next adjacent beam area. Pin(n,m) can be calculated from Pout(n,m).

For reductions in calculation size, circuit size, and power consumption on the satellite side, the ground stations can perform a part of all of the kinds of arithmetic processing performed by the interference-source detecting unit 10 and the reception-DBF control unit 7a. In this case, the communication apparatus of the satellite transmits, using the feeder link radio lines or other radio lines, signals split in the minimum frequency unit by the reception FBs 8-1 to 8-M to the ground stations. The ground stations execute the calculation of Pout(n,m), the calculation of simultaneous equations, the detection of an interference source area, and the calculation of a weight value for realizing null formation. The ground stations transmit calculation results of a weight value and the like to the communication apparatus mounted on the satellite using the feeder link radio lines or the other radio lines.

The frequency sharing system for sharing a frequency with the ground radio cellular system is the premise of this embodiment. However, even in the case of a frequency division system for not sharing a frequency with the ground radio cellular system, the interference removal processing according to this embodiment is effective when innumerable interference sources affecting the satellite system are present and are concentrated on a specific plurality of areas. For example, the interference removal processing is also effective for prevention of interference in the own communication system that could occur when the directivity of a reception antenna pattern after initial beam formation is gentle. In this case, for reception beam signal directed to a certain area, an uplink signal directed to the satellite from another area in which the same frequency is used in the communication system according to this embodiment is an interference source. The interference removal processing is particularly effective when the users are concentrated on the other area and an interference amount increases.

A reduction in time from the initial beam formation until it becomes possible to perform communication through interference prevention can be realized by setting, during the beam formation at the initial time, null of a beam to be directed in a direction in which interference is predicted to occur in advance (a direction in the city area, etc.) using map information or population density information concerning a service area of the communication system according to this embodiment.

The interference-source detecting unit 10 can improve a tracking property to time fluctuation of an interference source by detecting regularity in a time direction concerning appearance and disappearance of a detected interference source area or regularity in a time direction concerning an interference amount change (e.g., periodicity in unit of one day or one week) and, when the regularity is detected, predicting and controlling, based on the regularity, null formation of an antenna pattern. Further, the interference-source detecting unit 10 can further improve performance by also performing real-time interference prevention, which deals with irregular interference wave occurrence as well, using both a currently-obtained interference source area and information concerning the detected regularity.

A multiple access system of the ground cellular system that shares a frequency with the communication system according to this embodiment is CDMA (Code Division Multiple Access) and a multiple access system of the multi-beam satellite system is a system other than the CDMA (TDMA (Time Division Multiple Access), FDMA (Frequency Division Multiple Access), OFDM (Orthogonal Frequency Division Multiplexing), etc.). Such systems are desirable because advantages (A) to (C) explained below are realized.

(A) A signal spectrum arriving at the satellite from the ground cellular system becomes flat in a system band (=$BW_{CDMA}$) of the CDMA. Therefore, for signals of frequencies in the communication system according to this embodiment dotted in $BW_{CDMA}$, the signal spectrum is an interference source having equal interference power density. Therefore, because S/I does not change irrespective of at which frequencies the signals of the frequencies of the communication system according to this embodiment dotted in $BW_{CDMA}$ are arranged, it is easy to perform system design (calculation of S/I, line design, etc.)).

Figure 12:
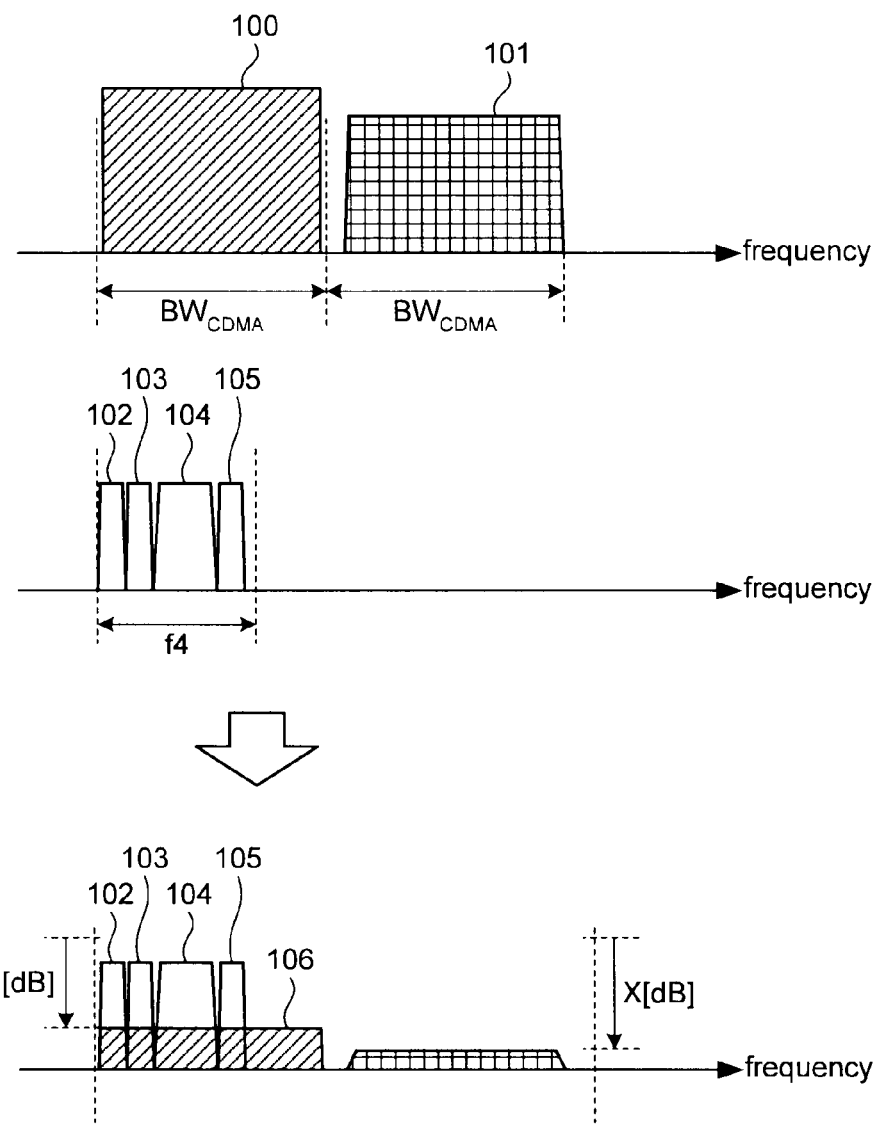
FIG. 12 is a diagram of an example of an interference signal that occurs when a ground cellular system adopts a CDMA system.

FIG. 12 is a diagram of an example of an interference signal that occurs when the ground cellular system adopts the CDMA system. In FIG. 12, spectra 100 and 101 indicate CDMA signal spectra from the ground radio cellular system in an adjacent area. Spectra 102, 103, 104, and 105 indicate signals from users in the communication system according to this embodiment that uses the f4 frequency band. A spectrum 106 indicates a spectrum of an interference signal. As shown in FIG. 12, the spectra 100 and 101 are flat in the system band (=$BW_{CDMA}$) of the CDMA and an increase or decrease of a signal level of the spectra 100 and 101 is proportional to the number of users of the ground radio cellular system. The spectra 100 and 101 are attenuated by X [dB] according to a side lobe characteristic of an antenna pattern and interfere with user signals in the communication system according to this embodiment that uses the f4 frequency band. However, because the spectrum 106 of the interference signal is also flat, influence on the spectra 102, 103, 104, and 105 is the same. The S/I is the same in all the cases. This effect makes it easy to design the multi-beam satellite system.

(B) As shown in FIG. 12, the spectra 100 and 101 are flat in the system band (=$BW_{CDMA}$) of the CDMA. Therefore, even when minimum frequency unit of the reception FBs 8-1 to 8-N is rough and frequency resolution of a reception signal spectrum is rough, the interference-source detecting unit 10 can accurately calculate an interference amount from the ground radio cellular system.

(C) Conversely, when the communication system according to this embodiment interferes with the ground radio cellular system, a plurality of signals transmitted from the communication apparatus according to this embodiment are frequency-spread by inverse spread processing performed by a receiver of the radio cellular system, a ground radio cellular system robust against interference can be realized by improvement of C/I (Carrier to Interference) corresponding to a spread gain of the frequency spread.

The multiple access system of the multi-beam satellite system can be the CDMA system and the multiple access system of the ground cellular system that shares a frequency can be a system other than the CDMA (TDMA, FDMA, or OFDM). In this case, effects (a) to (c) explained below can be obtained.

(a) Signals (an interference wave) from the ground cellular system are transferred to the ground stations and spectrum-spread by inverse spread processing performed by the ground stations. Therefore, as in the effect (A), an interference amount of the signals is not unevenly distributed to a specific frequency. Therefore, the S/I after inverse spread does not depend on a frequency at which the interference wave occurs and is proportional to only the number of users of the ground radio cellular system. This effect makes it easy to design the communication system according to this embodiment.

(b) The band width per one wave of the communication system according to this embodiment is increased by spectrum spread. Therefore, the minimum frequency unit of splitting and combining of the reception FBs 8-1 to 8-M and the transmission FBs 13-1 to 13-M of the communication apparatus can be rough. This makes it possible to reduce the circuit size and the power consumption of the reception FBs 8-1 to 8-M and the transmission FBs 13-1 to 13-M.

Conversely, when the communication system according to this embodiment interferes with the ground radio cellular system, signals transmitted from the communication apparatus mounted on the satellite changes to a frequency-spread interference wave. Therefore, the S/I does not change depending on frequencies of signals of the ground radio cellular system in the frequency-spread band. The S/I of the ground ratio cellular system is proportional to the number of users in the communication system according to this embodiment. This effect makes it easy to design the ground radio cellular system.

As explained above, in this embodiment, the interference-source detecting unit 10 calculates average electric power based on signals split in the minimum frequency unit obtained from the reception FBs 8-1 to 8-M, calculates a reception signal spectrum as Pout(n,m), and calculates Pin(n,m) based on a predetermined relation between Pout(n,m) and Pin(n,m). The interference-source detecting unit 10 detects, based on calculated Pin(n,m), an adjacent area where a strong interference wave occurs. The reception-DBF control unit 7 calculates weight to apply null formation to the detected adjacent area. Therefore, even when innumerable interference waves are present, it is possible to reduce the influence of interference from the ground radio cellular system without increasing circuit size from that of the reception FB in the past.

In this embodiment, the hybrid mobile communication system in which a frequency is shared between the communication system according to this embodiment and the ground radio cellular system is explained as an example. However, a system that shares a frequency is not limited to the ground radio cellular system and can be another radio system. For example, the system that shares a frequency can be another multi-beam satellite system or a radio LAN system rather than the ground radio cellular system.

In this embodiment, the communication apparatus mounted on the satellite is explained. However, the communication apparatus is not only mounted on the satellite but can be widely applied to a radio communication system that directs beams to a plurality of areas and performs communication. For example, the communication apparatus according to this embodiment can be used as an indoor radio base station (access point) that is set on the ceiling in a room and performs communication with a plurality of radio terminals present in a plurality of small areas or an outdoor radio base station that is set on a steel tower or a pole on the outside and performs communication with a plurality of mobile terminals present in a plurality of areas.

Second Embodiment.

A second embodiment of the communication apparatus according to the present invention is explained below. The configuration of the communication apparatus and the configuration of a communication system according to this embodiment are the same as those in the first embodiment. Only differences from the first embodiment are explained below.

In this embodiment, detection of an interference source area and an interference amount is realized by simple comparison processing and subtraction processing without using the simultaneous equations described in the first embodiment. As explained in the first embodiment, Pin(n,m) can be calculated from Pout(n,m) by solving the simultaneous equations. However, it is also conceivable that, because of the size of an arithmetic circuit, it is difficult to perform processing for solving such simultaneous equations. Therefore, in this embodiment, rather than calculating Pin(n,m) and specifying an interference source area, an interference source area and an interference amount of the interference source area are specified by comparison of Pout(n,m) and a predetermined threshold and subtraction processing.

For example, when Pout(3,4), Pout(4,4), and Pout(5,4) shown in FIG. 10 explained in the first embodiment are compared, because a signal level from the ground radio cellular system of the area 63 is high, Pout(3,4) obtained by directing a beam to the area 63 indicates a large value. In this way, the interference-source detecting unit 10 extracts, concerning the f4 frequency band as a frequency band used by the area 64, Pout(n,m) of an adjacent area and compares the sizes of Pout(n,m). In the case of FIG. 10, the interference-source detecting unit 10 can determine that the area 63 is an interference source area for a beam directed to the area 64. Receiving a result of the determination, the reception-DBF control unit 7 performs null formation in the area 63 concerning the beam directed to the area 64.

Figure 13:
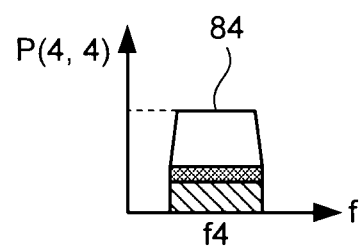
FIG. 13 is a diagram of an example of a reception signal spectrum in a frequency band f4 obtained when a reception beam is directed to the area 64 and null is formed in the area 63.

FIG. 13 is a diagram of an example of a reception signal spectrum in the frequency band f4 obtained when a reception beam is directed to the area 64 and null is formed in the area 63. A spectrum 84 is a reception signal spectrum Pout(4,4) in the frequency band f4 in this case. As shown in FIG. 13, a value of Pout(4,4) decreases according to a reduction in an interference amount from the area 63. As a result a desired wave level S/interference wave level I ratio of the beam directed to the area 64 increases.

In this way, for example, in the beam directed to the area 64, when a value higher than a predetermined threshold PTH is present among Pout(1,4), Pout(2,4), Pout(3,4), Pout(5,4), Pout(6,4), and Pout(7,4) obtained from beams directed to areas around the area 64, an area corresponding to the high value can be determined as an interference source area. The interference-source detecting unit 10 outputs the interference source area determined in this way and an interference amount of the interference source area to the reception-DBF control unit 7.

For example, when an initial state is the state shown in FIG. 7, it is assumed that Pout(1,4) and Pout(3,4) exceed the threshold. At this point, the interference-source detecting unit 10 determines that interference at a medium level (Pout(1,4)-PTH) is added from the area 61 and interference at a large level (Pout(3,4)-PTH) is added from the area 63 to the reception signal in the frequency band f4 of the beam directed to the area 64.

Figure 14:
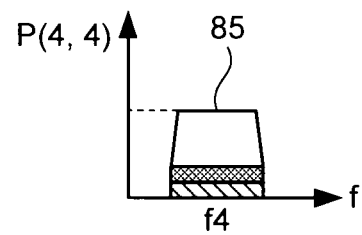
FIG. 14 is a diagram of an example of a reception signal spectrum in the frequency band f4 obtained when a reception beam is directed to the area 64 and nulls are formed in the area 63 and an area 61.
Figure 15:
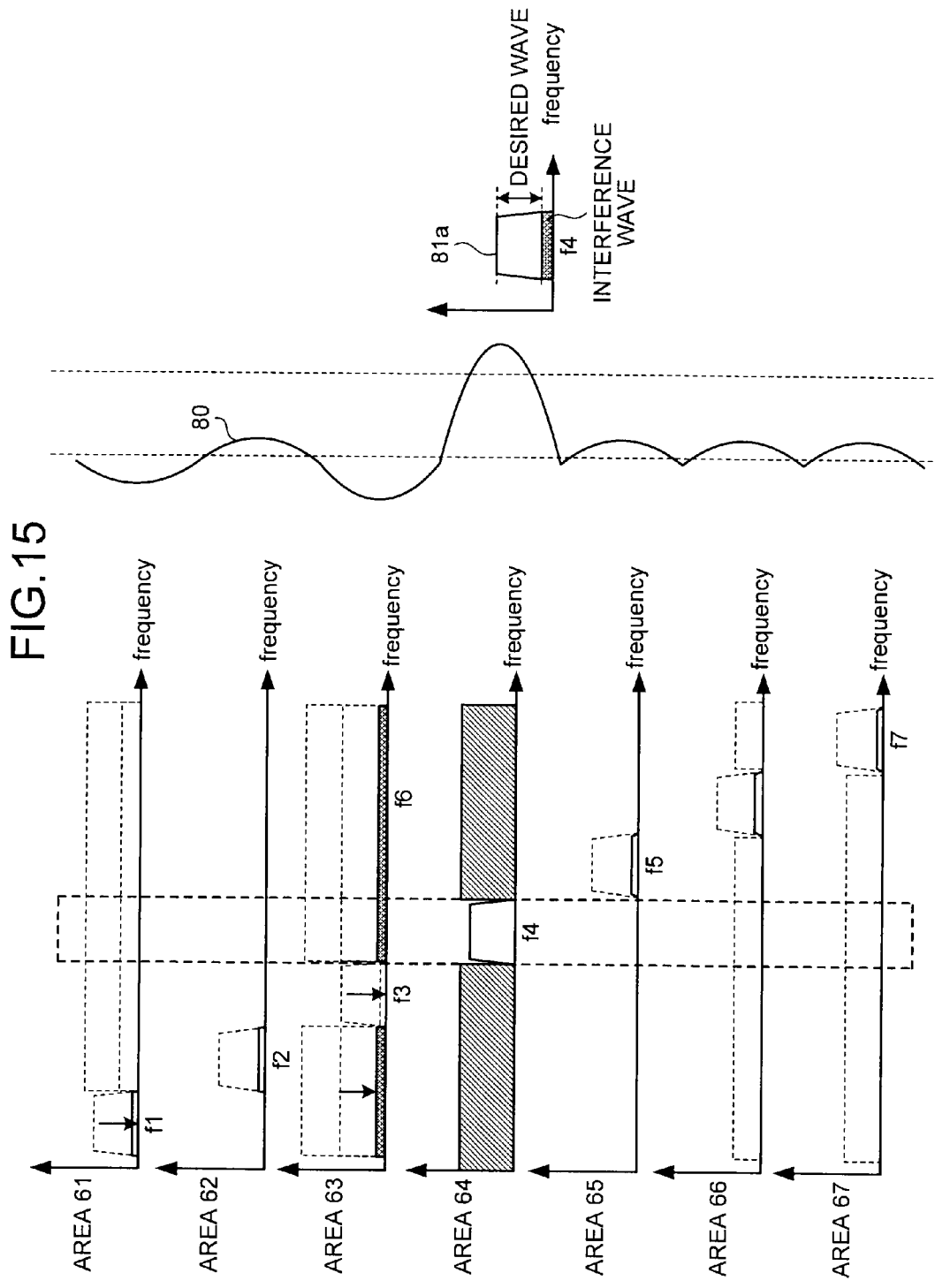
FIG. 15 is a diagram of an example of a reception signal spectrum obtained when a reception beam is directed to the area 64 and nulls are formed in the area 63 and the area 61.

Receiving a result of the determination, the reception-DBF control unit 7 outputs weight values for realizing null formation for antennas in the area 61 and the area 63 concerning the beam directed to the area 64. Then, an interference wave decreases from the reception spectrum Pout(4,4). FIG. 14 is a diagram of an example of a reception signal spectrum in the f4 frequency band obtained when a reception beam is directed to the area 64 and nulls are formed in the area 63 and the area 61. A spectrum 85 is a reception signal spectrum Pout(4,4) in the frequency band f4. FIG. 15 is a diagram of an example of a reception signal spectrum obtained when a reception beam is directed to the area 64 and nulls are formed in the area 63 and the area 61. A spectrum 81a shown in FIG. 15 is a reception signal spectrum in the frequency band f4 obtained when a reception beam is directed to the area 64 and nulls are formed in the area 63 and the area 61 when there are transmission signals shown on the left side from the areas. As shown in FIGS. 14 and 15, it is possible to realize higher S/I according to removal of an interference wave.

Even if the processing explained above is performed and null formation is performed in the interference source area, when attenuation of a reception signal level (in the above example, Pout(4,4)) does not occur, the interference-source detecting unit 10 can determine that an amount of influence on a desired signal by interference from the interference source area is small and perform feedback processing for relaxing or releasing the null formation.

The interference-source detecting unit 10 can calculate a magnitude relation among Pout(j,4) exceeding the threshold PTH and perform, stepwise in order from a largest numerical value among numerical values of Pout(j,4), interference prevention for areas corresponding to the values.

The processing for the frequency band f4 of the beam directed to the area 64 is explained above. Similarly, the interference-source detecting unit 10 detects, based on all Pout(n,4) (n=1, 2, 3, . . . ) in the frequency band f4, an area as an interference source of interference with the communication system according to this embodiment, which uses the frequency band f4, and an interference amount of the area. Similarly, the interference-source detecting unit 10 detects, using all Pout(n,m), an area as an interference source and an interference amount of the area for all frequency bands used in the communication system and all reception beams and outputs a result of the detection to the reception-DBF control unit 7. The reception-DBF control unit 7 calculates weight to form null in the interference source area. Operations in this embodiment other than those explained above are the same as those in the first embodiment.

When an antenna beam characteristic at the initial time is a characteristic that requires to also taken into account a signal in the next adjacent beam area, the interference prevention processing can be realized in the same manner by collecting, while expanding an area from an adjacent area to the next adjacent area, Pout(n,m) used in interference source area detection, comparing Pout(n,m) with the threshold PTH, and detecting an interference source area.

As explained above, in this embodiment, for each reception beam, when Pout(n,m) of an adjacent area of a reception beam area of the reception beam exceeds the threshold, the adjacent area is determined as an interference source area. Therefore, compared with the first embodiment, it is possible to further substantially reduce a calculation amount, circuit size, and power consumption.

Third Embodiment

Figure 16:
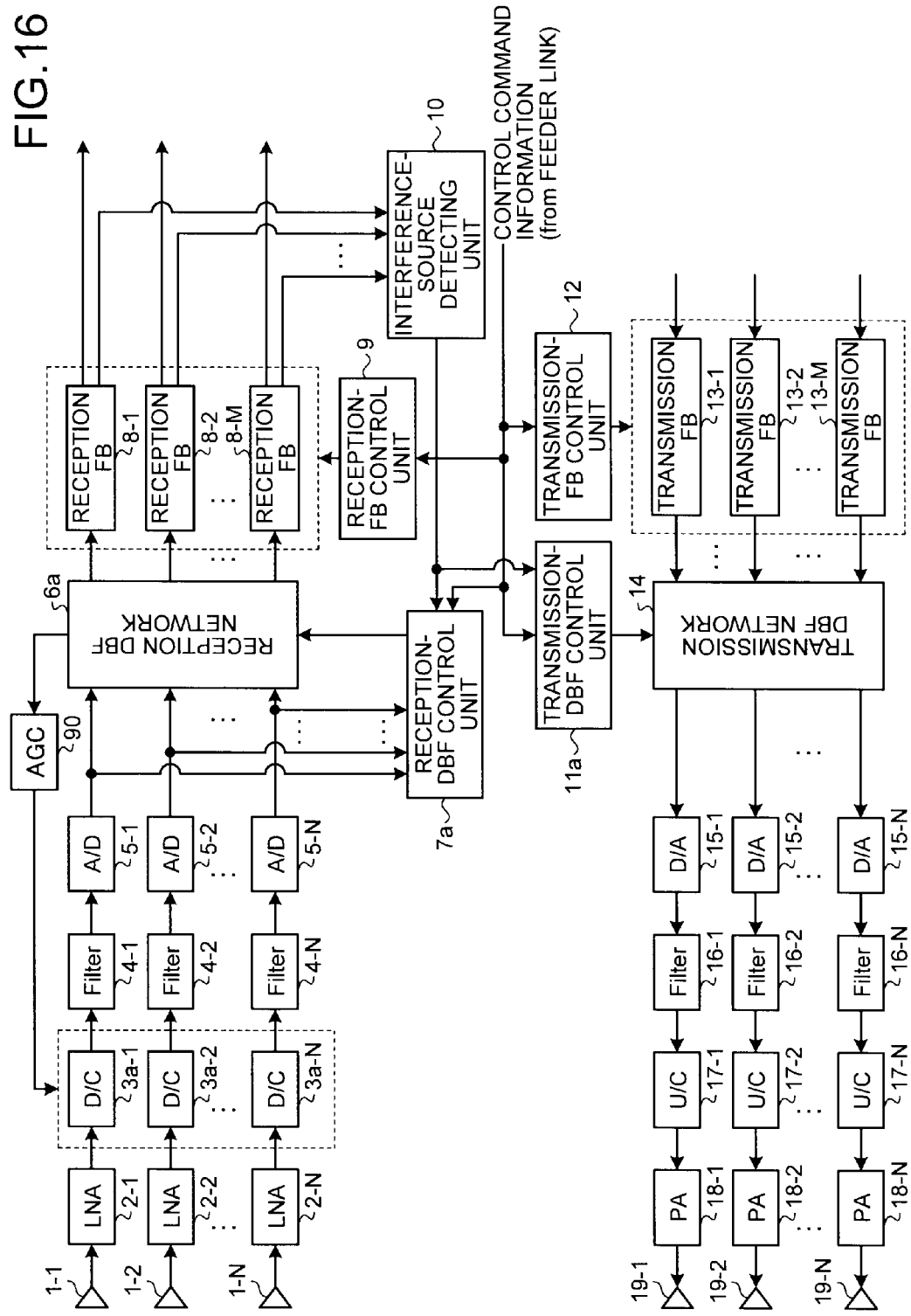
FIG. 16 is a diagram of a functional configuration example of a communication apparatus according to a third embodiment.

FIG. 16 is a diagram of a functional configuration example according to a third embodiment of the communication apparatus according to the present invention. As shown in FIG. 16, the communication apparatus according to this embodiment is the same as the communication apparatus according to the first embodiment except that an automatic gain control (AGC) unit 90 is added to the communication apparatus according to the first embodiment and the D/Cs 3-1 to 3-N, the reception DBF network 6, the reception-DBF control unit 7, and the transmission-DBF control unit 11 are respectively replaced with D/Cs 3a-1 to 3a-N, a reception DBF network 6a, a reception-DBF control unit 7a, and a transmission-DBF control unit 11a. The configuration of a communication system according to this embodiment is the same as the configuration of the communication system according to the first embodiment except that the communication apparatus according to the first embodiment is replaced with the communication apparatus according to this embodiment. Components having functions same as those in the first embodiment are denoted by the same reference numerals and signs and explanation of the components is omitted.

In this embodiment, two functions explained below are added to the functions in the first embodiment.

(1) An AGC function for reducing influence on communication and an interference preventing operation even when an interference wave at an extremely strong level is input (2) A function for reducing interference applied to users of ground radio cellulars by the satellite First, the function (1) is explained. In the communication apparatus according to the first embodiment, when an interference level from the ground radio cellular system is extremely strong or when an extremely strong interference wave is input to the reception antenna elements 1-1 to 1-N, in some case, a reception signal exceeds an input level range of the A/Ds 5-1 to 5-N (a normal operation range of the A/Ds). In this case, data after A/D sampling is output only as maximum and minimum two values. Therefore, signal processing (formation of a reception beam signal and null formation in an interference source area) of the reception DBF network 6 after the output of the data is not normally performed.

To prevent this influence, in this embodiment, the reception DBF network 6a calculates electric powers (reception electric powers) of digital data respectively sampled by the A/Ds 5-1 to 5-N. The AGC 90 calculates an average of the reception electric powers calculated for each of the A/Ds 5-1 to 5-N.

When all calculated values of the reception electric powers are equal to or smaller than a predetermined threshold THa, the AGC 90 determines whether a reception signal is within the input level of the A/Ds and sets a gain value of the D/Cs 3a-1 to 3a-N to a maximum (e.g., 0 dB). On the other hand, when any one of the calculated averages of the reception electric powers exceeds the threshold THa, the AGC 90 determines that the reception signal exceeds the range of the input level of the A/Ds and performs control for reducing the gain value of the D/Cs 3a-1 to 3a-N (e.g., changes the gain value from 0 dB to −6 dB). After this control, when all averages of the reception electric powers calculated again are equal to or smaller than the threshold THa, the AGC 90 performs control for increasing the gain value of the D/Cs 3a-1 to 3a-N to the maximum (e.g., changes the gain value from −6 dB to 0 dB).

According to such feedback control, even when an extremely strong interference wave level is input, a reception signal does not steadily exceed the input level range of the A/Ds 5-1 to 5-N. It is possible to solve a problem in that digital reception beam formation and interference operation are impossible.

When the extremely strong interference wave level is input, in the reception signal, interference wave components are predominant and components of a desired wave decrease. Therefore, energy of the desired wave components after the reception signal is adjusted to the input level range of the A/Ds 5-1 to 5-N decrease and the number of amplitude bits of the reception signal is lost. Therefore, to solve this problem as well, when the reception DBF network 6a outputs reception beams after combining signals of each of the reception array antenna elements 1-1 to 1-N to the reception FBs 8a-1 to 8a-N, the reception DBF network 6a outputs the reception beams without reducing the number of bits (without deleting lower several bits) of the amplitude of the reception signal increased by the combination. The reception FBs 8a-1 to 8a-N perform calculation to maintain bit accuracy of the amplitude and realize improvement of the bit accuracy. In the general processing in the past, the number of bits is reduced when the signal after the combination is output.

The function (2) is explained. It is meant that a large number of users of the ground radio cellular system are present in the interference source area calculated by the processing explained in the first or second embodiment. A transmission signal directed to the areas of the communication system according to this embodiment from the satellite affects the users of the ground radio cellular system. In particular, in an area determined as an interference source area, because a large number of users of the ground radio cellular system are present, when interference occurs in this area, the users affected by the interference increase. Therefore, it is desirable not to interfere with this area.

Therefore, the transmission-DBF control unit 11a performs, using an interference source area and an interference amount of the interference source area received from the interference-source detecting unit 10, control to improve directivity of transmission beams directed to the vicinity of the interference source area and reduces a side lobe level affecting the interference source area as much as possible (performs control to narrow down the directivity of an antenna pattern). Operations in this embodiment other than the operations explained above are the same as those in the first embodiment. The D/Cs 3*a*-1 to 3*a*-N, the reception DBF network 6*a*, the reception-DBF control unit 7*a*, and the transmission-DBF control unit 11*a* respectively have functions same as the functions of the D/Cs 3-1 to 3-N, the reception DBF network 6, the reception-DBF control unit 7, and the transmission-DBF control unit 11 according to the first embodiment and perform the same operations other than the operations of the additional functions (1) and (2).

In this embodiment, the functions (1) and (2) are added to the communication apparatus according to the first embodiment. However, the functions (1) and (2) can be added to the communication apparatus according to the second embodiment. In this embodiment, both the functions (1) and (2) are added. However, the function (1) or (2) alone can be added to the communication apparatus according to the first or second communication apparatus.

As explained above, in this embodiment, the AGC 90 determines whether reception electric power exceeds the threshold THa and controls, based on a determination result, the gain of the D/Cs 3*a*-1 to 3*a*-N. Therefore, even when an extremely strong interference wave level is input, a reception signal does not steadily exceed the input level range of the A/Ds 5-1 to 5-N. It is possible to solve the problem in that digital reception beam formation and interference operation are impossible.

In this embodiment, the transmission-DBF control unit 11*a* improves directivity of transmission beams directed to the vicinity of the calculated interference source area and reduces a side lobe level affecting the interference source area as much as possible. Therefore, it is possible to reduce interference that a transmission signal from the communication apparatus according to this embodiment applies to an area where a large number of users of the ground radio cellular system are present.

Fourth Embodiment

Figure 17:
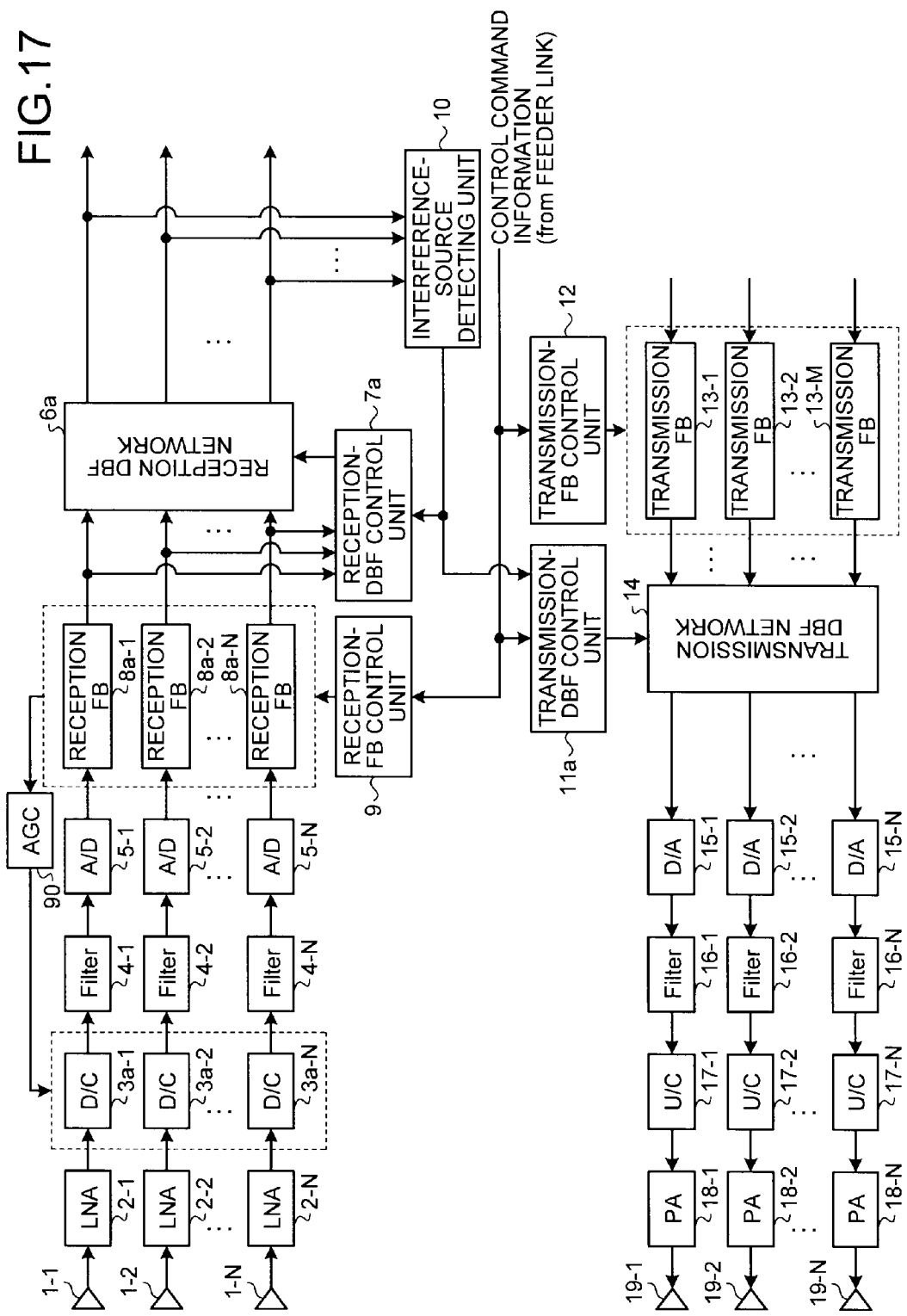
FIG. 17 is a diagram of a functional configuration example of a communication apparatus according to a fourth embodiment.

FIG. 17 is a diagram of a functional configuration example of a fourth embodiment of the communication apparatus according to the present invention. As shown in FIG. 17, the communication apparatus according to this embodiment is the same as the communication apparatus according to the third embodiment except that the reception FBs 8-1 to 8-M of the communication apparatus according to the third embodiment are replaced with reception FBs 8*a*-1 to 8*a*-N and the arrangement of the reception DBF network 6*a* is changed from a pre-stage of the reception FBs 8-1 to 8-M and the reception-FB control unit 9 to a post-stage of the reception FBs 8*a*-1 to 8*a*-N and the reception-FB control unit 9. The configuration of a communication system according to this embodiment is the same as the configuration of the communication system according to the third embodiment except that the communication apparatus according to the third embodiment is replaced with the communication apparatus according to this embodiment. Components having functions same as those in the third embodiment are denoted by the same reference numerals and signs and explanation of the components is omitted.

In this embodiment, the reception FBs 8*a*-1 to 8*a*-N split an input signal in the same manner as the reception FBs 8-1 to 8-M according to the third embodiment. However, in this embodiment, the reception FBs 8*a*-1 to 8*a*-N are respectively arranged for each of the reception array antenna elements 1-1 to 1-N and respectively apply frequency splitting to digital signals input from the A/Ds 5-1 to 5-N. The reception DBF network 6*a* forms a reception beam signal with respect to signals frequency-split by the reception FBs 8*a*-1 to 8*a*-N. The reception DBF network 6*a* outputs a reception beam signal to the interference-source detecting unit 10. The interference-source detecting unit 10 detects, based on the reception beam signal, an interference source area and an interference amount. By adopting such a configuration, it is possible to quickly realize estimation of an arriving direction of a main wave and directivity control using a known signal allocated to a narrow band.

Operations in this embodiment are explained in detail below. When the posture of a satellite mounted with the communication apparatus according to this embodiment is disordered, an arriving direction of a signal from the same point on the ground changes. Therefore, when the posture of the satellite is disordered (directivity accuracy fluctuates), it is necessary to perform antenna directivity control for always directing a transmission and reception antenna to the arriving direction.

As means for the directivity control, for example, there is a method of performing feedback processing using a known signal (a pilot signal) emitted from a ground station. From the viewpoint of frequency effective utilization, in general, a frequency band allocated to the known signal (the pilot signal) is allocated to an entire system band a little (e.g., one several thousandth). The remaining frequency band is allocated to a signal band for communication. Therefore, in the configurations in the first to third embodiments, when directivity control using the pilot signal is realized, a signal input to the reception-DBF control unit 7 or the reception-DBF control unit 7*a* is a signal obtained by combining communication signals before being split output from the A/Ds 5-1 to 5-N and the pilot signal. Therefore, only the pilot signal cannot be used.

Therefore, after beam formation is performed in the reception DBF network 6 or the reception DBF network 6*a*, it is necessary to extract a pilot signal from signals after being split by the reception FBs 8-1 to 8-M and perform processing. In other words, when this directivity control is realized in the configurations according to the first to third embodiments, feedback processing is performed using the pilot signal after the beam formation, whereby the reception-DBF control unit 7 or the reception-DBF control unit 7*a* updates weight values to gradually realize the directivity control.

On the other hand, in the configuration according to this embodiment, when the same directivity control is realized, the reception-DBF control unit 7*a* can perform feedback control by extracting, for each of array antenna elements, a pilot signal from split signals output from the reception FBs 8*a*-1 to 8*a*-N and calculating weight values for realizing desired antenna directivity using the pilot signal. Therefore, because the reception-DBF control unit 7*a* can directly set the weight values in the reception DBF network 6*a*, the reception DBF can quickly operate compared with the directivity control performed in the configurations according to the first to third embodiments. Operations in this embodiment other than those explained above are the same as the operations in the third embodiment.

In the example explained with reference to FIG. 17, the configuration according to the third embodiment is changed. However, the directivity control in this embodiment can be realized by, in the communication apparatus according to the first or second embodiment, replacing the reception FBs 8-1 to 8-M with the reception FBs 8*a*-1 to 8*a*-N and changing the arrangement of the reception DBF network 6 from a pre-stage of the reception FBs 8-1 to 8-M and the reception-FB control unit 9 to a post-stage of the reception FBs 8*a*-1 to 8*a*-N and the reception-FB control unit 9.

In this embodiment, to perform quick processing, the configuration shown in FIG. 17 is adopted. However, for example, when there is margin in processing time, the reception-DBF control unit 7 or the reception-DBF control unit 7a can update the weight values and realize the directivity control by performing the feedback processing using the pilot signal after the beam formation without changing the arrangement of the reception DBF network 6 from the configurations according to the first to third embodiments.

As explained above, in this embodiment, the reception FBs 8a-1 to 8a-N and the reception-FB control unit 9 are arranged in the pre-stage of the reception DBF network 6. The reception-FB control unit 9 extracts a pilot signal from outputs of the reception FBs 8a-1 to 8a-N, which split signals before beam formation, and sets weight values based on the extracted pilot signal to thereby perform directivity control. Therefore, it is possible to quickly perform processing compared with the directivity control performed using the pilot signal in the configurations according to the first to third embodiments.

Industrial Applicability

As explained above, the communication apparatus and the communication system according to the present invention are useful for a multi-beam communication system that covers a communication area with a plurality of beams and is, in particular, suitable for a hybrid mobile communication system shared by a ground radio system and a satellite mobile system.

Reference Signs List 1-1 to 1-N reception array antenna elements
2-1 to 2-N LNAs
3-1 to 3-N D/Cs
4-1 to 4-N, 16-1 to 16-N filters
5-1 to 5-N A/Ds
6, 6a reception DBF networks
7, 7a reception-DBF control units
8-1 to 8-M, 8a-1 to 8a-N reception FBs
9 reception-FB control unit
10 interference-source detecting unit
11, 11a transmission-DBF control units
12 transmission-FB control unit
13-1 to 13-M transmission FBs
14 transmission DBF network
15-1 to 15-N D/As
17-1 to 17-N U/Cs
18-1 to 18-N PAs
19-1 to 19-N transmission array antenna elements
21-1 to 21-7 two-channel filter banks
22 selecting unit
31 high-frequency side decimeter
32 low-frequency side decimeter
41 to 49 average electric powers
61 to 71 areas
80 pattern
81 to 85, 81a, 100 to 106 spectra

The invention claimed is:

1. A communication apparatus comprising:
a reception array antenna including N, wherein N is a natural number array antenna elements;
a reception-beam forming unit that generates a reception beam signal using a reception signal from each of the array antenna elements according to digital beam formation processing, the reception beam signal forming M reception beams in different beam areas, wherein M is a natural number; and
a reception filter bank that generates frequency split reception beam signals obtained by frequency-splitting the reception beam signal, wherein
the communication apparatus comprises an interference-source detecting unit that is configured
to store, for each reception beam, an interference candidate beam area as a beam area that is estimated based on an initial reception beam characteristic set in advance and the interference candidate beam area interferes with the reception beam,
to calculate, based on the frequency split reception beam signals, a reception spectrum for each reception beam, and
to calculate, based on the reception spectrum for each reception beam and a reception spectrum of a reception beam directed to the interference candidate beam area, for each combination of the reception beam and a respective frequency allocated to the reception beam, an interference source area as a beam area which is an interference source, and
the reception-beam forming unit controls, for each combination of the reception beam and the respective frequency, the reception beam signal to perform null formation in a direction of the interference source area.

2. The communication apparatus according to claim 1, wherein the reception-beam forming unit extracts a pilot signal included in each reception signal and forms, based on the extracted pilot signal, the reception beams in different beam areas to thereby perform directivity control.

3. The communication apparatus according to claim 1, wherein the interference-source detecting unit is configured,
to set as an intra-area transmission signal, a signal transmitted from a target beam area as an area covered by the reception beam,
to set, based on the initial reception beam characteristic, for each combination of the reception beam and the frequency, a relational expression of an intra-area transmission signal corresponding to the reception beam, an intra-area transmission signal of the reception beam that is directed to the interference candidate beam area, and an estimated value of a spectrum of a reception signal of the reception beam,
to set relational expressions, which are set for different combinations, as simultaneous equations,
to substitute reception spectra of the same combination in the estimated value to calculate, based on the simultaneous equations after the substitution, an intra-area transmission signal, and
to calculate, for each reception beam, based on an intra-area transmission signal in a beam area estimated in advance to interfere with the reception beam signal, an interference source area for each the combination.

4. The communication apparatus according to claim 1, wherein the interference-source detecting unit sets, when the reception spectrum of the reception beam directed to the interference candidate beam area is equal to or larger than a predetermined threshold, the interference candidate beam area as the interference source area.

5. The communication apparatus according to claim 1, further comprising:
an A/D conversion unit that analog-digital converts a signal received by the reception array antenna and outputs a digital signal; and
an AGC unit that adjusts, based on the digital signal, a level of a signal input to the A/D conversion unit, wherein
the communication apparatus uses the digital signal as the reception signal.

6. The communication apparatus according to claim 1, further comprising:
- a transmission array antenna including transmission array antenna elements; and
- a transmission-beam forming unit that generates, using a transmission signal for each of the transmission array antenna elements, a transmission beam signal for forming M, wherein M is a natural number, transmission beams to different beam areas according to digital beam formation processing, wherein
- the transmission-beam forming unit controls the transmission beam signal to reduce occurrence of leakage to the interference source area.

7. A communication system comprising:
- an artificial satellite comprising the communication apparatus according to claim 1;
- a user terminal that performs radio communication with the communication apparatus; and
- a ground station that transmits, based on position and posture of the artificial satellite, beam information including an irradiation direction of a reception beam to the artificial satellite, wherein
- the artificial satellite forms, based on the beam information, a reception beam.

8. The communication system according to claim 7, wherein the communication system adopts a CDMA system and shares a frequency band with a radio system that adopts a multiple access system other than the CDMA system.

9. The communication system according to claim 7, wherein the communication system adopts a multiple access system other than a CDMA system and shares a frequency band with a radio system that adopts the CDMA system.

10. The communication system according to claim 8, wherein
- the communication system divides the shared frequency band into a plurality of divided frequency bands and allocates a divided frequency band from the plurality of divided frequency bands to a beam area covered by the communication apparatus of the artificial satellite such that different divided frequency bands are used in beam areas adjacent to one another, and
- the radio system uses, in the beam area, a frequency different from the divided frequency band allocated to the beam area.

11. The communication system according to claim 10, wherein the communication system sets, as one group, beam areas to which the different divided frequency bands are allocated and repeatedly arranges groups such that allocated divided frequency bands of the beam areas adjacent to one another are different.

12. A communication apparatus comprising:
- a reception array antenna including N, wherein N is a natural number array antenna elements;
- a reception filter bank that generates frequency split signals obtained by frequency-splitting a reception signal from each of the array antenna elements; and
- a reception-beam forming unit that generates frequency split reception beam signals using the frequency split signals according to digital beam formation processing, the frequency split reception beam signals forming M reception beams in different beam areas, wherein M is a natural number, wherein
- the communication apparatus comprises an interference-source detecting unit that is configured
- to store, for each reception beam, an interference candidate beam area as a beam area that is estimated based on an initial reception beam characteristic set in advance and the interference candidate beam area interferes with the reception beam,
- to calculate, based on the frequency split reception beam signals, a reception spectrum for each reception beam, and
- to calculate, based on the reception spectrum for each reception beam and a reception spectrum of a reception beam directed to the interference candidate beam area, for each combination of the reception beam and a respective frequency allocated to the reception beam, an interference source area as a beam area which is an interference source, wherein
- the reception-beam forming unit controls, for each combination of the reception beam and the respective frequency, the reception beam signal to perform null formation in a direction of the interference source area.

13. The communication apparatus according to claim 12, wherein the reception-beam forming unit extracts a pilot signal included in the frequency split signals and forms, based on the extracted pilot signal, the reception beams in different beam areas to thereby perform directivity control.

14. The communication apparatus according to claim 12, wherein the interference-source detecting unit is configured,
- to set as an intra-area transmission signal, a signal transmitted from a target beam area as an area covered by a reception beam,
- sets, based on the initial reception beam characteristic, for each combination of the reception beam and the frequency, a relational expression of an intra-area transmission signal corresponding to the reception beam, an intra-area transmission signal of the reception beam directed to the interference candidate beam area, and an estimated value of a spectrum of a reception signal of the reception beam,
- to set relational expressions, which are set for different combinations, as simultaneous equations,
- to substitute reception spectra of the same combination in the estimated value to calculate, based on the simultaneous equations after the substitution, an intra-area transmission signal, and
- to calculate, for each reception beam, based on an intra-area transmission signal in a beam area estimated in advance to interfere with the reception beam signal, an interference source area for each the combination.

15. The communication apparatus according to claim 12, wherein the interference-source detecting unit sets, when the reception spectrum of the reception beam directed to the interference candidate beam area is equal to or larger than a predetermined threshold, the interference candidate beam area as the interference source area.

16. The communication apparatus according to claim 12, further comprising:
- an A/D conversion unit that analog-digital converts a signal received by the reception array antenna and outputs a digital signal; and
- an AGC unit that adjusts, based on the digital signal, a level of a signal input to the A/D conversion unit, wherein
- the communication apparatus uses the digital signal as the reception signal.

17. The communication apparatus according to claim 12, further comprising:
- a transmission array antenna including transmission array antenna elements; and
- a transmission-beam forming unit that generates, using a transmission signal for each of the transmission array antenna elements, a transmission beam signal for forming M, wherein M is a natural number, transmission beams to different beam areas according to digital beam formation processing, wherein the transmission-beam forming unit controls the transmission beam signal to reduce occurrence of leakage to the interference source area.

18. A communication system comprising:

an artificial satellite comprising the communication apparatus according to claim 3;

a user terminal that performs radio communication with the communication apparatus; and a ground station that transmits, based on position and posture of the artificial satellite, beam information including an irradiation direction of a reception beam to the artificial satellite, wherein the artificial satellite forms, based on the beam information, a reception beam.

19. The communication system according to claim 18, wherein the communication system adopts a CDMA system and shares a frequency band with a radio system that adopts a multiple access system other than the CDMA system.

20. The communication system according to claim 18, wherein the communication system adopts a multiple access system other than a CDMA system and shares a frequency band with a radio system that adopts the CDMA system.

21. A communication system comprising:

an artificial satellite comprising a communication apparatus including:

a reception array antenna including N, wherein N is a natural number array antenna elements;

a reception-beam forming unit that generates a reception beam signal using a reception signal from each of the array antenna elements according to digital beam formation processing, the reception beam signal forming M reception beams in different beam areas, wherein M is a natural number; and a reception filter bank that generates frequency split reception beam signals obtained by frequency-splitting the reception beam signal;

a user terminal that performs radio communication with the communication apparatus; and a ground station that transmits to the artificial satellite, based on position and posture of the artificial satellite, beam information including an irradiation direction of a reception beam, wherein the communication apparatus of the artificial satellite transmits, to the ground station the frequency split reception beam signals, the ground station is configured to store, for each reception beam, an interference candidate beam area as a beam area that is estimated based on an initial reception beam characteristic set in advance and the interference candidate beam area interferes with the reception beam, to calculate, based on the frequency split reception beam signals, a reception spectrum for each reception beam, to calculate, based on the reception spectrum for each reception beam and a reception spectrum of a reception beam directed to the interference candidate beam area, for each combination of the reception beam and a respective frequency allocated to the reception beam, an interference source area as a beam area which is an interference source, to calculate a weight value for performing null formation in a direction of the interference source area for each the combination, and transmits the weight value to the artificial satellite comprising the communication apparatus, and the communication apparatus of the artificial satellite forms, based on the weight value, a reception beam.

22. The communication system according to claim 21, wherein the communication system adopts a CDMA system and shares a frequency band with a radio system that adopts a multiple access system other than the CDMA system.

23. The communication system according to claim 21, wherein the communication system adopts a multiple access system other than a CDMA system and shares a frequency band with a radio system that adopts the CDMA system.

24. The communication system according to claim 23, wherein the communication system divides the shared frequency band into a plurality of divided frequency bands and allocates a divided frequency band from the plurality of divided frequency bands to a beam area covered by the communication apparatus of the artificial satellite such that different divided frequency bands are used in beam areas adjacent to one another, and the radio system uses, in the beam area, a frequency different from the divided frequency band allocated to the beam area.

25. The communication system according to claim 24, wherein the communication system sets, as one group, beam areas to which the different divided frequency bands are allocated and repeatedly arranges groups such that allocated divided frequency bands of the beam areas adjacent to one another are different.

* * * * *